United States Patent
Rief et al.

(10) Patent No.: US 10,230,077 B2
(45) Date of Patent: Mar. 12, 2019

(54) CARRIER SYSTEM FOR A BACKPACK ENERGY SOURCE, ENERGY SOURCE AND BACKPACK ENERGY SOURCE ASSEMBLY

(75) Inventors: Joachim Rief, Biberach (DE); Corinna Mönch, Neu-Ulm (DE); Ottmar Locher, Ulm-Donaustetten (DE); Tobias Zeller, Neu-Ulm (DE); Johan Hallendorf, Jönköpng (SE); Gustav Landberg, Johanneshov (SE)

(73) Assignee: HUSQVARNA AB, Huskvarna (SE)

( * ) Notice: Subject to any disclaimer, the term of this patent is extended or adjusted under 35 U.S.C. 154(b) by 442 days.

(21) Appl. No.: 14/385,521

(22) PCT Filed: Mar. 19, 2012

(86) PCT No.: PCT/EP2012/054846
§ 371 (c)(1),
(2), (4) Date: Sep. 16, 2014

(87) PCT Pub. No.: WO2013/139371
PCT Pub. Date: Sep. 26, 2013

(65) Prior Publication Data
US 2015/0041512 A1   Feb. 12, 2015

(51) Int. Cl.
*H01M 2/10* (2006.01)
*A45F 3/04* (2006.01)
*A45F 3/14* (2006.01)

(52) U.S. Cl.
CPC ............. *H01M 2/1005* (2013.01); *A45F 3/04* (2013.01); *H01M 2/1022* (2013.01); *A45F 2003/146* (2013.01); *H01M 2220/30* (2013.01)

(58) Field of Classification Search
CPC .. H01M 2/1005; A45F 3/06–3/10; A45F 3/04; A45F 3/042; A45F 3/047; A45F 3/08; A45F 3/12; A45F 3/14; A45F 2003/045; A45F 2003/122; A45F 2003/125; A45F 2003/127; A45F 2003/146
(Continued)

(56) References Cited

U.S. PATENT DOCUMENTS

| 3,657,021 A | 4/1972 | Mathews | |
| 4,505,058 A * | 3/1985 | Peterson | E02F 9/2841 24/581.1 |

(Continued)

FOREIGN PATENT DOCUMENTS

| CN | 201076146 Y | 6/2008 |
| CN | 201156561 Y | 11/2008 |

(Continued)

OTHER PUBLICATIONS

International Search Report and Written Opinion of PCT/EP2012/054846 dated Jul. 17, 2012, all enclosed pages cited.

(Continued)

*Primary Examiner* — Scott McNurlen
(74) *Attorney, Agent, or Firm* — Burr Forman McNair

(57) ABSTRACT

Carrier system for a backpack energy source, energy source and backpack energy source assembly The invention in particular is directed to a carrier system for a backpack energy source (2). The carrier system comprises a carrier plate (4) with a coupling interface (25) implemented to be exchangeably coupled to a counter coupling interface (31) of an energy source (2).

14 Claims, 19 Drawing Sheets

(58) Field of Classification Search
USPC ........ 224/627–659, 249, 255–256, 259–263, 224/265, 268–269, 271–272, 902; 429/97, 123; 403/409.1, 80, 324
See application file for complete search history.

(56) References Cited

U.S. PATENT DOCUMENTS

| | | | |
|---|---|---|---|
| 4,632,888 | A | 12/1986 | Kump et al. |
| 5,095,259 | A | 3/1992 | Bailey et al. |
| 5,105,958 | A * | 4/1992 | Patton ................... A45F 3/16 215/14 |
| 5,213,913 | A | 5/1993 | Anthony, III et al. |
| 5,289,605 | A | 3/1994 | Armbruster |
| 5,368,954 | A | 11/1994 | Bruns |
| 5,401,592 | A | 3/1995 | Gilpin et al. |
| 5,628,443 | A * | 5/1997 | Deutsch ............... A45C 7/0086 150/113 |
| 5,680,026 | A | 10/1997 | Lueschen |
| 5,697,808 | A | 12/1997 | Chen |
| 5,732,867 | A * | 3/1998 | Perkins ................. A45F 3/08 224/271 |
| 5,881,823 | A | 3/1999 | Kabatnik et al. |
| 5,954,250 | A * | 9/1999 | Hall ..................... A45F 3/08 224/262 |
| 6,031,183 | A | 2/2000 | Guerrieri |
| 6,066,211 | A | 5/2000 | Sandell |
| 6,087,815 | A | 7/2000 | Pfeifer et al. |
| 6,106,971 | A | 8/2000 | Spotnitz |
| 6,168,881 | B1 | 1/2001 | Fischer et al. |
| 6,181,032 | B1 | 1/2001 | Marshall et al. |
| 6,290,111 | B1 | 9/2001 | Hedenberg et al. |
| 6,357,533 | B1 | 3/2002 | Buchholz et al. |
| 6,357,534 | B1 | 3/2002 | Buetow et al. |
| 6,412,572 | B2 | 7/2002 | Habedank et al. |
| 6,501,197 | B1 | 12/2002 | Cornog et al. |
| 6,597,152 | B1 | 7/2003 | Jacobs et al. |
| 6,615,930 | B2 | 9/2003 | Bongers-Ambrosius et al. |
| 6,840,335 | B1 | 1/2005 | Wu |
| 6,848,120 | B2 | 2/2005 | Kling et al. |
| 6,967,465 | B2 | 11/2005 | Takano et al. |
| 7,015,675 | B1 | 3/2006 | Andre |
| 7,025,627 | B2 | 4/2006 | Rosenthal et al. |
| 7,052,799 | B2 | 5/2006 | Zatezalo et al. |
| 7,145,314 | B2 | 12/2006 | Aradachi et al. |
| 7,157,883 | B2 | 1/2007 | Johnson et al. |
| 7,198,186 | B2 | 4/2007 | Kling et al. |
| 7,243,734 | B2 | 7/2007 | Wu |
| 7,382,104 | B2 | 6/2008 | Jacobson et al. |
| 7,429,430 | B2 | 9/2008 | Mooty et al. |
| 7,443,137 | B2 | 10/2008 | Scott et al. |
| 7,455,544 | B2 | 11/2008 | Glauning et al. |
| 7,554,287 | B2 | 6/2009 | Duesselberg |
| 7,567,058 | B2 | 7/2009 | Shimizu et al. |
| 7,592,773 | B2 | 9/2009 | Pellenc |
| 7,648,383 | B2 | 1/2010 | Matthias et al. |
| 7,661,486 | B2 | 2/2010 | Turner et al. |
| 7,670,714 | B2 | 3/2010 | Matthias |
| 7,679,323 | B2 | 3/2010 | Roehm et al. |
| 7,766,097 | B2 | 8/2010 | Kondo |
| 7,816,888 | B2 | 10/2010 | Rejman et al. |
| 7,828,185 | B2 | 11/2010 | Hofmann et al. |
| 7,858,219 | B2 | 12/2010 | Agehara et al. |
| 7,867,663 | B2 | 1/2011 | Park et al. |
| 7,879,479 | B2 | 2/2011 | Roehm et al. |
| 7,879,482 | B2 | 2/2011 | Matthias |
| 7,883,360 | B2 | 2/2011 | Hirt |
| 7,887,942 | B2 | 2/2011 | Rejman et al. |
| 7,932,694 | B2 | 4/2011 | Watanabe et al. |
| 7,940,025 | B2 | 5/2011 | Duesselberg |
| 7,997,466 | B2 * | 8/2011 | Fidrych ................. A45F 3/047 224/578 |
| 7,999,507 | B2 | 8/2011 | Heinen |
| 8,006,877 | B2 | 8/2011 | Lowry et al. |
| 8,066,164 | B2 | 11/2011 | Gregory |
| D653,325 | S | 1/2012 | Cheesman et al. |
| 8,092,932 | B2 | 1/2012 | Phillips et al. |
| 8,123,098 | B2 | 2/2012 | Miyata |
| 8,133,064 | B2 | 3/2012 | Nishimura |
| 8,148,000 | B2 | 4/2012 | Furuta et al. |
| 8,163,414 | B2 | 4/2012 | Wan et al. |
| 8,573,454 | B2 * | 11/2013 | Talavera Tolentino ... A45F 4/02 224/153 |
| 9,224,994 | B2 | 12/2015 | Ota et al. |
| 9,337,677 | B2 | 5/2016 | Suzuki |
| 2001/0035736 | A1 | 11/2001 | Person |
| 2002/0030466 | A1 | 3/2002 | Tracey |
| 2002/0125757 | A1 | 9/2002 | LeTournoux |
| 2002/0125857 | A1 | 9/2002 | Mastaler et al. |
| 2003/0090162 | A1 | 5/2003 | Cornog et al. |
| 2003/0090239 | A1 | 5/2003 | Sakakibara |
| 2003/0121682 | A1 | 7/2003 | Carrancho |
| 2004/0081882 | A1 | 4/2004 | Ontl |
| 2004/0173656 | A1 * | 9/2004 | Seong ................... A45F 3/04 224/644 |
| 2004/0192106 | A1 | 9/2004 | Britz |
| 2005/0161305 | A1 | 7/2005 | Jenni et al. |
| 2006/0091856 | A1 | 5/2006 | Lee et al. |
| 2006/0199072 | A1 | 9/2006 | Lui et al. |
| 2006/0220612 | A1 | 10/2006 | Feldmann et al. |
| 2006/0222931 | A1 | 10/2006 | Lin |
| 2006/0244013 | A1 | 11/2006 | Lay |
| 2007/0090796 | A1 | 4/2007 | Norris |
| 2007/0173090 | A1 | 7/2007 | Johnson et al. |
| 2007/0277987 | A1 | 12/2007 | Meyer et al. |
| 2007/0292749 | A1 * | 12/2007 | Coombs .................... A47L 5/36 429/96 |
| 2008/0003495 | A1 | 1/2008 | Shimizu |
| 2008/0012526 | A1 | 1/2008 | Sadow |
| 2008/0192432 | A1 | 8/2008 | Hsu Huang et al. |
| 2008/0207026 | A1 | 8/2008 | Meyer et al. |
| 2008/0211327 | A1 | 9/2008 | Schlegel et al. |
| 2008/0241653 | A1 | 10/2008 | Chang |
| 2008/0311795 | A1 | 12/2008 | Brotto et al. |
| 2009/0071990 | A1 * | 3/2009 | Jardine ................. A45F 3/10 224/155 |
| 2009/0148755 | A1 | 6/2009 | Heinen et al. |
| 2009/0252994 | A1 | 10/2009 | Livingston |
| 2010/0000097 | A1 | 1/2010 | Johnson |
| 2010/0062326 | A1 | 3/2010 | Konuma et al. |
| 2010/0136425 | A1 | 6/2010 | Gau et al. |
| 2010/0197209 | A1 | 8/2010 | Dehde et al. |
| 2010/0221589 | A1 * | 9/2010 | Friedli ................. H01M 2/1066 429/96 |
| 2010/0282252 | A1 | 11/2010 | Cheesman et al. |
| 2010/0291419 | A1 | 11/2010 | Zhou |
| 2010/0320969 | A1 | 12/2010 | Sakakibara et al. |
| 2011/0005088 | A1 | 1/2011 | Pellenc |
| 2011/0012560 | A1 | 1/2011 | Sakakibara |
| 2011/0016674 | A1 | 1/2011 | Jablonski |
| 2011/0162219 | A1 | 7/2011 | Okouchi |
| 2011/0197389 | A1 | 8/2011 | Ota et al. |
| 2011/0198103 | A1 | 8/2011 | Suzuki |
| 2011/0278339 | A1 * | 11/2011 | Hexels .................. A45F 3/08 224/676 |
| 2012/0045678 | A1 | 2/2012 | Hayashi et al. |
| 2012/0048588 | A1 | 3/2012 | Iyoda et al. |
| 2012/0052356 | A1 | 3/2012 | Sugiura et al. |
| 2013/0103169 | A1 | 4/2013 | Wuertele |
| 2014/0345604 | A1 * | 11/2014 | Wang ...................... A62B 7/02 128/202.13 |

FOREIGN PATENT DOCUMENTS

| | | |
|---|---|---|
| CN | 201369348 Y | 12/2009 |
| CN | 201402850 Y | 2/2010 |
| CN | 201405719 Y | 2/2010 |
| CN | 101743799 A | 6/2010 |
| CN | 101890900 A | 11/2010 |
| CN | 202016044 U | 10/2011 |
| CN | 102263217 A | 11/2011 |
| CN | 202042530 U | 11/2011 |
| CN | 202159716 U | 3/2012 |
| DE | 4301508 A1 | 7/1994 |

(56) References Cited

FOREIGN PATENT DOCUMENTS

| | | |
|---|---|---|
| DE | 29910045 U1 | 10/1999 |
| DE | 20116741 U1 | 2/2002 |
| DE | 10302000 A1 | 7/2004 |
| DE | 202005018897 U1 | 2/2006 |
| DE | 202007016137 U1 | 5/2008 |
| EP | 1075906 A2 | 2/2001 |
| EP | 0823840 B1 | 6/2002 |
| EP | 2099085 A2 | 9/2009 |
| EP | 2284928 A2 | 2/2011 |
| EP | 2333874 A1 | 6/2011 |
| EP | 2398108 A1 | 12/2011 |
| FR | 2623345 A1 | 5/1989 |
| FR | 2916320 A1 | 11/2008 |
| GB | 2383765 A | 7/2003 |
| JP | 62066562 A | 9/1985 |
| JP | H0911759 A | 1/1997 |
| JP | H106248 A | 1/1998 |
| JP | H1015839 A | 1/1998 |
| JP | H1015851 A | 1/1998 |
| JP | H11129960 A | 5/1999 |
| JP | 2000123806 A | 4/2000 |
| JP | 2000133222 A | 5/2000 |
| JP | 2000208114 A | 7/2000 |
| JP | 2002260618 A | 9/2002 |
| JP | 2002260619 A | 9/2002 |
| JP | 2002373708 A | 12/2002 |
| JP | 3915376 B2 | 5/2007 |
| JP | 2007287492 A | 11/2007 |
| JP | 2008047325 A | 5/2008 |
| JP | 2009069494 A | 4/2009 |
| JP | 4580746 B2 | 11/2010 |
| JP | 2011071567 A | 4/2011 |
| JP | 2011142104 A | 7/2011 |
| JP | 2011216304 A | 10/2011 |
| WO | 9725896 A1 | 7/1997 |
| WO | 2000038255 A1 | 6/2000 |
| WO | 2001041235 A1 | 6/2001 |
| WO | 2011037451 A1 | 3/2011 |
| WO | 2011129171 A1 | 10/2011 |
| WO | 2012005159 A1 | 1/2012 |
| WO | 2012008244 A1 | 1/2012 |
| WO | 2012048240 A2 | 4/2012 |

OTHER PUBLICATIONS

Chapter I of the International Preliminary Report on Patentability of PCT/EP2012/054846 dated Sep. 23, 2014, all enclosed pages cited.
International Search Report and Written Opinion for International Application No. PCT/EP2012/054847 dated Jul. 18, 2012.
International Search Report and Written Opinion for International Application No. PCT/EP2012/073444 dated Apr. 8, 2013.
International Search Report and Written Opinion for International Application No. PCT/EP2013/055698 dated Jul. 11, 2013.
International Preliminary Report on Patentability for International Application No. PCT/EP2012/073444 dated Sep. 23, 2014.
International Preliminary Report on Patentability for International Application No. PCT/EP2012/054847 dated Sep. 23, 2014.
International Preliminary Report on Patentability for International Application No. PCT/EP2013/055698 dated Sep. 23, 2014.

* cited by examiner

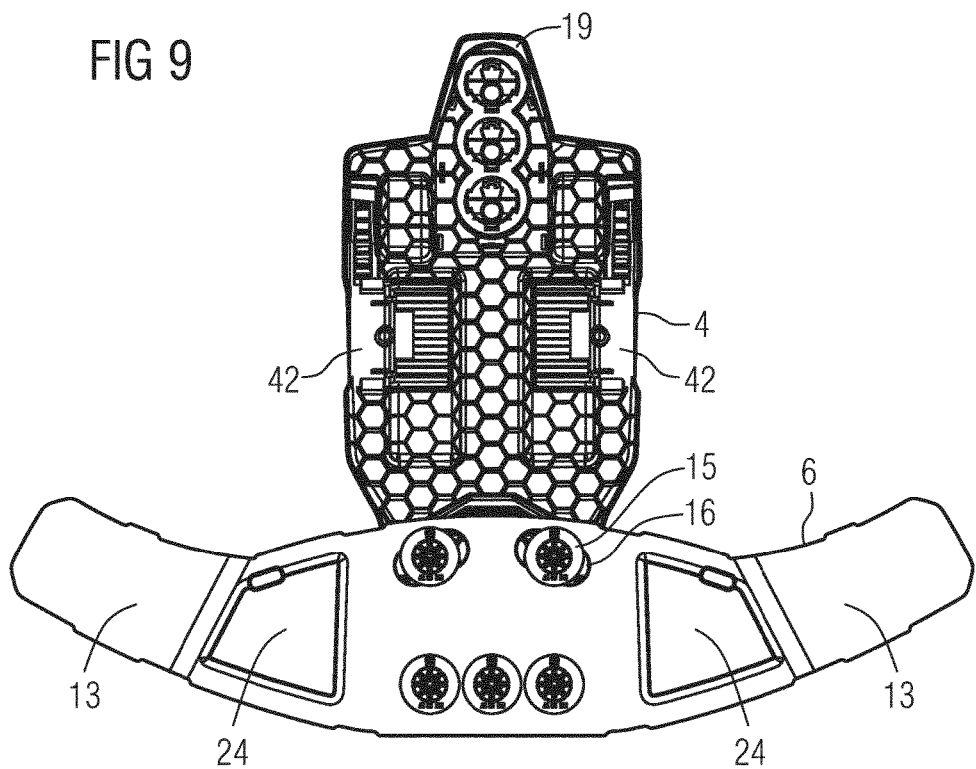
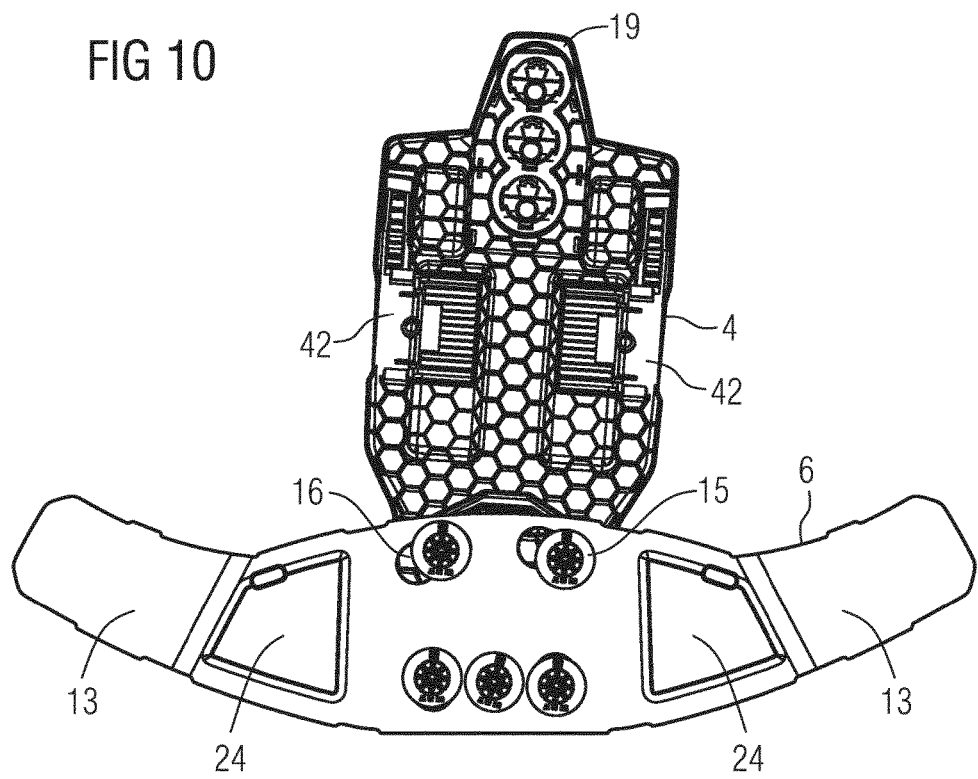

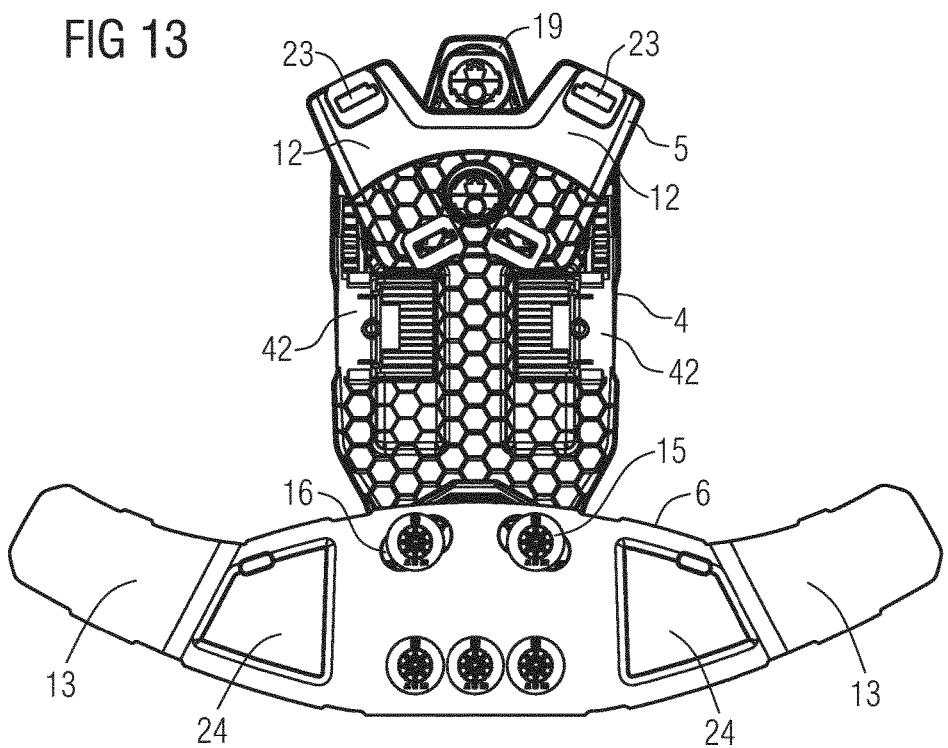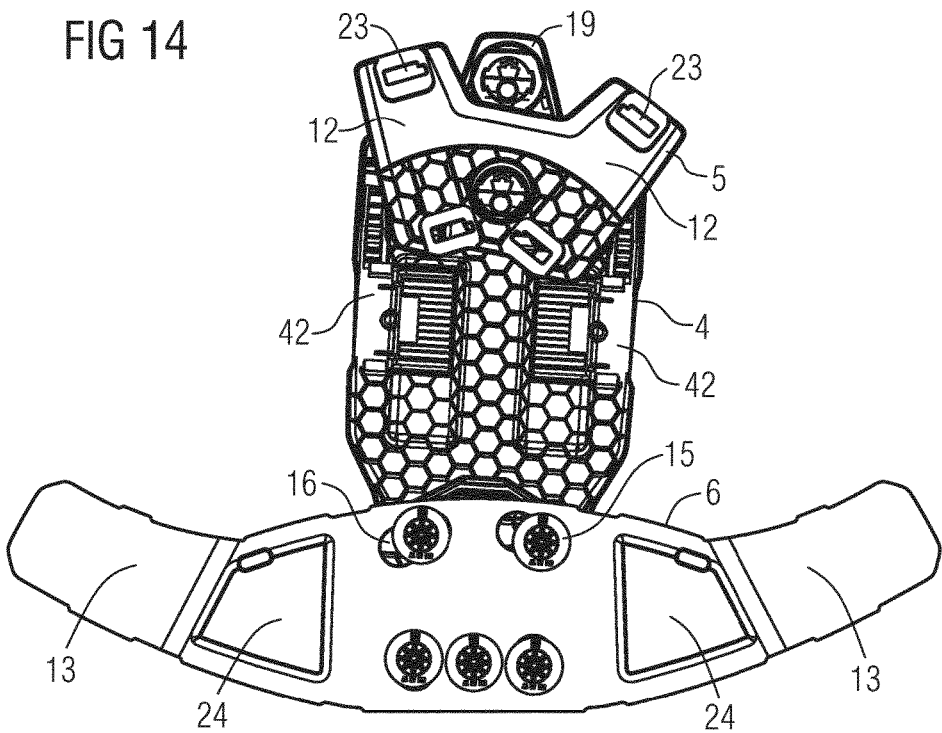

CARRIER SYSTEM FOR A BACKPACK ENERGY SOURCE, ENERGY SOURCE AND BACKPACK ENERGY SOURCE ASSEMBLY

The present invention relates to a carrier system for a backpack energy source, in particular a backpack battery pack, to an energy source and backpack energy source Backpack battery packs are known to be used with electrically operated handheld devices, in particular power tools such as hedge trimmers, clearing saws, chain saws, brush cutters, trimmers, blowers, screw drivers, drills, hammer drills, nailers, staplers, polishing or grinding tools, etc.

Backpack battery packs have the advantage over conventional accumulator based cordless tools that larger battery packs, i.e. battery packs with larger capacities can be used. This in turn has the advantage that the overall operational time can be greatly enhanced.

Carrying battery packs for e.g. several hours of operating a respective handheld device on the back may be wearisome. Therefore it is in particular desirable to provide possibilities to comfortably and conveniently carry energy sources on the back.

Therefore, it is one of the objects of the invention to provide a carrier system for a backpack energy source, which allows a user to comfortably and conveniently carry an energy source, in particular a battery pack. Under the same considerations, a corresponding energy source and backpack energy source shall be provided. A further object is to provide a backpack energy source and corresponding carrier system and energy source, which provide provides easy handling and easy operation.

According to claim 1, a carrier system for a backpack energy source, in particular a mobile backpack energy source, is provided. A backpack energy source shall mean an energy source, in particular an energy source for storing electrical energy, such as a battery, accumulator and/or capacitor pack, which energy source is adapted and intended to be carried at a person's back, in particular analogous to and along the principles of conventional backpacks or rucksacks. A respective energy source, in particular battery pack, shall be adapted to be carried on a user's back while at the same time providing satisfactory freedom of movement for the user.

A backpack energy source may be used for providing and holding available electricity for operating electric tools, in particular handheld devices and the like off the electricity grids. It shall be noted, that operating respective devices in the handcraft area may require prolonged wearing times, in particular over several days, weeks or months. Hence, conditions and comfort of wear of the carrier system are of great relevance. As will become apparent in connection with the description below, in particular the proposed carrier system can best cope with these requirements.

The carrier system comprises a carrier plate, in particular a backpack carrier plate. Such a backpack carrier plate may be adapted to rest on the back of a user, in particular comprising the region ranging from shoulders to waist of a human user. The carrier plate in particular may be implemented as a central carrier plate or platform.

The carrier plate as such is implemented for receiving, in particular carrying an energy source, in particular battery pack, of the backpack energy source. In particular for carrying, holding or fixing the energy source to the carrier plate, the carrier plate comprises a coupling interface. The coupling interface preferably is implemented at a side of the carrier plate averted from the side of the carrier plate in the end resting on the user's back.

It is preferred that the carrier plate, at least at the coupling interface intended for receiving the energy source, is of essentially planar geometry. However, curvatures and other physical geometries and structures at a side of the carrier plate in the end contacting the user's back, may be provided to obtain optimal wear comfort, i.e. to best fit the contact face of the carrier plate contacting the back of the user to the human body, in particular human back, physique.

The coupling interface is implemented to being exchangeably, in particular removably, coupled to a counter coupling interface of the energy source, which in particular may be a battery, in particular battery pack and the like. In other words, the carrier system shall be adapted such that the proposed types of energy sources can be coupled to the carrier plate via the coupling interface and counter coupling interface. In the coupled state, the energy source is, preferably fixedly, attached to the carrier plate, such a user can easily and conveniently carry the energy source on his back. It shall be mentioned, that is of particular advantage it the energy source is fixedly locked to the carrier plate, which will be described in more detail below and further below.

The term carrier plate or plate in particular shall mean a 2-dimensional, preferably flat body, frame or chassis, preferably of defined thickness. In particular, the thickness of the plate in normal direction may be selected to meet respective load bearing requirements. The materials of the carrier plate, may be selected to obtain a light weight overall carrier system while simultaneously having sufficiently high load bearing properties. Plastic, fiber reinforced materials and others may be used as materials for manufacturing the carrier plate.

Using the proposed carrier plate has the advantage, that the load of the energy source can be, in particular evenly, distributed over a comparatively large surface, in particular a surface contacting the back of a user carrying the energy source on his back, providing favorable wear comfort. In particular, local pressure loads on the back of the user carrying the backpack energy source can greatly be avoided. Further it is possible that the user can carry the energy source for a long time in a comfortable and ergonomical manner. The carrier plate or baseplate has the further advantage, that the back of the user is shielded from the energy source, in particular heat generated from the energy source, by the carrier plate arranged between the back and the energy source during use. Also, the back of the user may be shielded in case of damages of the energy source, in particular the battery pack.

The form and shape of the carrier plate can be specially adapted to the human body structure, in particular human back structure and requirements of humans. Therefore ergonomic wear comfort can be obtained.

A bearing face or surface of the carrier plate averted from the coupling interface and intended to be oriented towards the back of the user and/or intended to be placed or to rest, at least partially and/or temporarily, on the back of the user may have a structure, in particular surface structure, effective in suppressing or reducing perspiration in the back area covered at least in sections by the carrier plate.

The bearing face may for example comprise ducts, channels or perforations for adequate aeration of at least sections of the back area covered by the carrier plate. Such elements of the bearing surface may be useful in providing passive aeration of the user's back. However, it may be thought of providing an active aeration system, for actively aerating the user's back.

In one embodiment, the carrier plate comprises, at least at a bearing side, i.e. a side averted from the coupling interface and intended to face the back of the user, an open celled, in particular stiffening type structure, preferably comprising at least one of a stiffening bar, stringer, fin and rib, preferably of linear, curved, crossed and/or honeycomb arrangement, in particular hexagonal honeycomb arrangement.

Providing a self supporting structure, in particular comprising at least one of bars, stringers, fins and ribs, may lead to a light weight construction, in particular light weight reinforced construction, which in turn will improve wear comfort.

The open-celled structure, in particular comprising openings of cells of the stiffening, in particular honeycomb, structure, preferably is oriented in normal direction of the carrier plate, and preferably towards the bearing surface, in particular a bearing surface at least partially contacting the back of the user while resting on the user's back.

The open-celled and/or stiffening structure on the one hand may provide enhanced mechanical strength with low or reduced weight. Further, the open-celled and/or stiffening structure, in particular openings at the back contact surface, i.e. bearing surface, may contribute and enhance aeration of the space between the user's back and the carrier system, in particular carrier plate. Therefore the proposed stiffening structure may lead to a two-fold benefit.

In one embodiment, the coupling interface is adapted to couple or decouple the energy source in an at least partially translational or linear movement which is parallel to the carrier plate, the coupling interface or the carrier plate. Such movements in particular are advantageous for easily and fixedly coupling the energy source to the carrier plate.

In a further embodiment, the coupling interface and/or the counter coupling interface is adapted such that during decoupling of the energy source from the carrier plate the translational or linear movement is followed by or combined with a lifting movement of the energy source away from the carrier plate, which is supported or effected by at least one pair of cooperating lifting elements at the coupling interfaces. It is further preferred that at least one of a pair of cooperating lifting elements has an inclined or wedged surface inclined towards a decoupling direction on which the other lifting element glides thereby lifting the energy source in a lifting movement, preferably in addition to the translational movement during the decoupling, away from the carrier plate, in particular in a direction orthogonal or normal to the carrier plate.

In one embodiment of the carrier system, the carrier plate comprises a center platform or baseplate, preferably and essentially corresponding to the extension or dimension of the coupling interface. The center platform or baseplate preferably offers and/or presents fastening elements, in particular in the form of elevations, such as hooks or guiding rails, and/or depressions, such as guiding grooves or counter hook elements. The fastening elements provided with the carrier plate are adapted to removably, in particularly exchangeably fasten or attach the energy source. Implementing the carrier plate, in particular center platform, as proposed beforehand may result in a multidimensional coupling interface having several cooperating fastening, fixing and/or guiding elements. Such elements may ease removal and/or fitting or mounting the energy source to the carrier plate.

In a further embodiment of the carrier system, the carrier plate comprises at least one extension, extending in axial direction of the carrier plate. It is preferred that the at least one extension, which may have an elongated geometry, is adapted to attach straps, in particular shoulder and/or waist straps, or also strap connectors to the carrier plate. The strap connectors may be shoulder strap connectors and/or waist strap connectors. The at least one extension of the carrier plate is preferably symmetric to an axial center line of the carrier plate. It s preferred that in lateral direction of the carrier plate, the extensions have a smaller width than the center platform or baseplate. This in particular allows undisturbed working actions even with the backpack energy source being attached to the user's back.

Note, that the coupling interface implemented at the properties and coupling elements of the carrier plate and the counter coupling interface implemented at the energy source may be interchanged without leaving the scope of the invention.

In an embodiment of the carrier system, the coupling interface comprises latching elements, in particular hook-type latching elements, such as hooks and/or counter latching elements, such as counter hook elements. The latching elements and/or counter latching elements are adapted to latch respective counter latching elements and/or latching elements, in particular hooks, of the energy source adapted to be coupled to the carrier plate. The number and arrangement of latching elements and/or counter latching elements, in particular hooks and counter hooks, may be selected according to respective requirements, inter alia defined or necessitated by the energy source, in particular the size, weight and dimension of the energy source, to be latched.

It may be preferred, that the latching elements, in particular hook elements, interact so as to hold the energy source, with respect to the ordinary position of use, against the gravity force as well as against the carrier plate, i.e. to prevent it from falling down or tilting away from the carrier plate. In addition or in the alternative it may be advantageous that at least three pairs of latching elements and counter latching elements are provided at the coupling interfaces, preferably one central latching element in a lower region and two lateral latching elements in an upper region of the carrier plate when carried in its upright position at the back.

The latching elements may comprise static latching elements, in particular static hooks, adapted to engage counterpart latching elements, in particular also of static type, of the energy source. The latching elements may also comprise non-static latching elements. Non-static in particular shall mean that the latching elements are moveable, in particular in parallel to the coupling interface and/or are pivotable, in particular relative to an axis running parallel to the coupling interface.

As already indicated, the latching elements may comprise hooks and/or counter hook elements. The hooks and/or counter hooks may be arranged on the carrier plate and project from and/or dive into the carrier plate. Hooks preferably project away from the carrier plate, in particular in right angle to the axial direction and coupling interface of the carrier plate. Hooks may, as already mentioned, for example be placed at an upper site and/or at a lower site of the carrier plate with reference to the ordinary orientation of use of the carrier plate.

The hooks, or in more general terms the latching elements, preferably are implemented as end stop latches in particular in connection with translational coupling movements between carrier plate and energy source, wherein in an end-stop latching position, the energy source and carrier plate are latched to each other. Latching in particular shall mean that at least one, preferably two, most preferably three motional degrees of freedom of the energy source and carrier plate are locked and/or blocked.

The coupling interface preferably comprises at least one positioning and/or guiding element, preferably adapted to establish a tight fit between the energy source and carrier plate. The positioning and/or guiding element may be adapted to position or align and guide the energy source during the coupling movement, in particular translational movement. Preferably, the at least one positioning and guiding element is implemented to have at least one of a recess and projection, wherein the at least one positioning and guiding element further preferably is of elongated shape, in particular having a main axial extension in parallel to the axial direction of the carrier plate, and/or wherein preferably each positioning and guiding element cooperates with a corresponding counter positioning and guiding element of the coupling interface of the energy source. In particular, the positioning and guiding elements may be adapted in such a way that a sliding, in particular translational, movement of the energy source relative to the carrier plate is required for coupling energy source and carrier system.

Openings of respective hooks may be oriented parallel or anti-parallel to each other. As an example, one central hook may be provided at a lower site of the carrier plate and two further hooks may be provided at an upper site, in particular at lateral upper sites, of the carrier plate, where respective hook openings are equally aligned towards the upper side of the carrier plate. In particular in this configuration, an energy source, such as a battery pack, may be fitted to the carrier plate in a translational, in particular sliding, and if implemented in a stepped sliding, top-down movement, in which the hooks engage corresponding hook openings for example. Top-down in this connection shall mean a movement from an upper side of the carrier plate towards a lower side of the carrier plate in axial direction, wherein upper and lower refer to the ordinary, in general essentially vertical, orientation of the carrier plate.

As a further example, openings of the hooks may be oriented anti-parallel. In particular in this case, the hooks and/or hook openings or counter hook elements may be movably attached, and preferably springloaded, such that the energy source may be fitted to the carrier plate in a pushing or pulling, pivoting and or translational movement. Pushing or pulling in this case may be used to move the hooks or counter hook elements against the springload in such a way that remaining hooks and counter hook elements can be engaged. In this case, springload forces may be adapted such that the energy source may be securely attached to the carrier plate. Elements for unlocking and retracting the hooks from the engaged position may be provided to allow removal of the energy source from the carrier plate.

However, for securely connecting the energy source and carrier plate with each other locking elements may be provided. The locking elements may be adapted to lock and/or block the latching elements and/or movement of the energy source relative to the carrier plate. In this connection, respective locking elements may act on the latching elements, the carrier plate and/or the energy source.

In a preferred variant, the carrier plate comprises at least one lateral side, preferably at both lateral sides, a locking element, in particular push-locking element, adapted to mutually lock the carrier plate and energy source in the coupled state. In particular, the locking element is adapted to intersect, lock or block a decoupling, in particular translational, relative movement of the carrier plate and energy source.

The locking element may be moveable in lateral direction relative to the carrier plate. The locking element of this variant is implemented such that it can interact with a counter locking element of the energy source fitted to the carrier plate. The locking element preferably is adapted to be in a locking position when pushed laterally inwards and to be in a non-locking position when pulled laterally outwards. The locking element or elements preferably are adapted to block or lock movements, for example by blocking guiding rails and the like, needed for removing the energy source from the carrier plate.

Locking elements as proposed herein are easy to use, preferably prevent wrong assembly and in particular provide safe fixation on the carrier system.

In particular, the locking mechanism can be operated even with gloves, greatly simplifying exchange of energy sources during use. The proposed locking mechanism in addition can be implemented in a robust way safely holding and locking the energy source to the carrier plate.

The coupling interface may, as already indicated, comprise at least one of positioning and guiding elements. The positioning and guiding elements may be implemented as recesses, depressions and/or elevations. The positioning and guiding elements may be adapted to mutually align and guide the carrier plate and energy source at least during exchange and/or demount actions. Note that the counter coupling interface may comprise corresponding counterpart positioning and guiding elements adapted to interact with the positioning and guiding elements of the carrier plate, in particular coupling interface.

The at least one of positioning and guiding elements may for example comprise guiding rails, guiding notches, guiding recesses and other elements. The counter coupling interface may comprise respective counterpart positioning and guiding elements. The guiding elements may in particular be adapted such that the carrier plate and energy source are kept at a certain distance during a certain phase of coupling or separating, i.e. mounting or demounting, the carrier plane and energy source, and such that in another phase the carrier plate and energy source closely fit against each other.

Preferably, the carrier plate and energy source are kept at a certain distance in an initial stage of connecting the energy source to the carrier plate, and in a final stage of disconnecting or removing the energy source from the carrier plate. Keeping a certain distance in the initial and final stage or phase simplifies setting/taking taking the energy source on/from the carrier plate.

Keeping a certain distance between the energy source and carrier plate at certain stages during mounting or demounting the energy source to or from the carrier plate may be obtained in providing wedge-shaped guiding and/or positioning elements. Wedged surfaces and counterpart wedged, sloped and/or straight surfaces or edges, may be used as sliding surfaces to obtain movements oriented transverse to mounting and/or demounting movements. It is preferred that mounting and demounting movements and respective positioning and guiding elements, are oriented, at least in sections, parallel to the coupling interface and carrier plate.

In a further embodiment, the coupling interface is adapted to latch and release the energy source in a translational, in particular linear translational, in particular sliding motion, linear stepped motion and/or parallel motion relative to the carrier plate. The translational, in particular linear translational or sliding motion, preferably is oriented essentially parallel to the carrier plate, in particular coupling interface. Further, the translational motion preferably is oriented parallel to the axial direction of the carrier plate, such as top-down or bottom-up. It shall be mentioned that the translational and/or sliding motion can also be a lateral motion, essentially perpendicular to the axial, i.e. longitudinal, direction of the carrier plate.

In particular in connection with translational motions, in particular motions at least partially or in sections parallel to the coupling interface, such as linear sliding motions, it is preferred that at least one of the positioning and guiding elements comprises at least one wedged surface designed for moving the energy source and carrier plate relative to each other in a direction transverse to a main translational motion, in particular sliding motion.

A main translational motion may be parallel, in particular essentially parallel, preferably at least in sections parallel, to the axial, i.e. longitudinal, direction of the carrier plate. Movements induced by the wedged surfaces may be oriented transverse to the main translational motion, in particular in at least one of a lateral and normal direction of the carrier plate. Wedged surfaces in particular may be provided to center and/or align the energy source relative to the carrier plate. This may be advantageous for proper and easy engagement of hooks and counter hook elements. Further, wedged surfaces may also be used to keep, in particular generate or remove in an initial or final stage of mounting or demounting the energy source, a certain distance between energy source and carrier plate. Further reference is made to the description above.

In a further embodiment, the carrier system may, as already indicated, comprise at least one push-locking element, in particular accessible from lateral sides of the carrier plate. The push locking element preferably is moveably attached to the carrier plate, and may be adapted to mutually lock the carrier plate and energy source in the coupled state. The push-locking element may be implemented in accordance with the locking element described further above. In particular the push-locking element is adapted to lock or block a translational relative movement between the carrier plate and energy source. It is preferred that the at least one push-locking element is movable in a direction transversal, in particular perpendicular, to the translational relative movement of carrier plate and energy source, in particular in axial direction of the carrier plate.

In a preferred embodiment, the at least one push-locking element in the locked state intersects and blocks a translational motion, in particular sliding motion, preferably of corresponding translational guiding elements, of the carrier plate and energy source.

Locking and/or blocking of a relative movement between energy source and carrier plate may comprise a form fit locking in that locking bars or strips intersect respective guiding elements of the coupling interface and/or counter coupling interface of the energy source.

If the carrier plate is adapted to mount the energy source in a top-down movement, the push-locking element is preferably adapted to block in the mounted state any bottom-up movements of the energy source. Similarly, if the carrier plate is adapted to mount the energy source in a bottom-up movement, the push-locking element is preferably adapted to block in the mounted state any top-down movements. Analog locking and blocking effects may be implemented for lateral coupling movements which are also conceivable.

In one embodiment, the push-locking element may comprise lateral locking bars, in particular accessible from lateral sides of the carrier plate. The locking bars preferably are movably attached to the carrier plate and adapted to lock the energy source and carrier plate in a pushed in position, in particular laterally pushed in position, and to release the energy source and carrier plate in a pushed out position, in particular in a laterally pushed or pulled out position. The push-locking element may be part of a flange and groove locking mechanism, in which a flange is adapted to enter or to be pushed into a groove, in particular in transversal direction, and block, for example, a translational, in particular linear, motion of the energy source relative to the carrier plate.

The proposed locking mechanism in general has several advantages as set out below. The locking mechanism allows the user to easily exchange and charge the battery pack, in particular energy source. The user can remove the battery, in particular battery-pack to charge it without the carrier system being mounted thereto. Therefore, the user has not the whole carrier system around the charger, which in particular leads to less space consumption during charging.

Further, the proposed locking mechanism allows a continuous work, as the user can easily remove a first battery pack to charge this and to mount a filled second battery pack to continue work with the same carrier system. If two users work together, the energy source, in particular battery pack can be removed from one of the users without requiring the other user to remove the carrier system from its back.

Removing the battery pack from the carrier system allows also to use the battery source without the carrier system as a stand alone battery, for example on the ground. Further, the carrier system may be adapted to receive different kinds of energy sources, in particular battery packs of different capacities. For this, preferably identic holding fixtures and the like, allowing to hold and couple the energy source to the carrier plate may be used.

In a further embodiment, a strap connector unit adapted to be fitted with straps for strapping the carrier system to a back of a user is provided. Preferably, the strap connector unit comprises at least one rest element, in particular supporting rest element, adapted to rest against the back of the user. It is preferred that the rest element is attached, coupled or mounted to the carrier plate in such a way that it is at least one of moveable parallel, i.e. essentially parallel, to the carrier plate and/or coupling interface and pivotable about an axis running essentially parallel to the carrier plate transversal axis. The transversal axis shall mean the carrier plate axis running perpendicular to the longitudinal axis, i.e. axial direction, of the carrier plate. As already indicated further above, the longitudinal axis in ordinary use of the carrier plate will be oriented essentially vertically. The movement parallel to the carrier plate may in particular comprise linear and/or rotational movements of the rest element. Pivotable movability may be obtained by swivel mounting the at least one rest element to the carrier plate.

A linear movement may for example be used to provide size adjustment, i.e. to adjust the location of the rest elements and corresponding straps to the size of a user. In particular in these cases, the at least one rest element may be movable between at least two different axial, i.e. longitudinal, positions of the carrier plate A rotational movement of the rest element in parallel to the carrier plate and/or pivoting movements a may for example be advantageous for compensating rigidity of the carrier plate. Such a compensation may be of particular advantage as the carrier plate in generally is not able to balance all movements of the user, in particular movements of the upper part of the body of the user in back or forth and/or left or right direction. In all, wear comfort of the carrier system can be improved. The proposed carrier system is or may be able to adjust to movements of the user. This in turn allows the user to be able to more or less move freely, which in particular is possible by the proposed rotatable carrier or rest elements.

In a further embodiment, the at least one rest element is one of a shoulder rest element and waist rest element. The shoulder rest element is intended and implemented to rest during ordinary operation in or on a shoulder region or area of the back of the user. The waist rest element is intended and implemented to rest during ordinary operation in or on a in a waist region of the back of the user. The rest elements in this embodiment preferably are attached to a side of the carrier plate averted from the coupling interface.

In one variant, the strap connector unit may comprise exactly two rest elements, viz a shoulder rest element and a waist rest element. The shoulder rest element may be positioned at an upper end or section of the carrier plate and the waist rest element may be positioned at a lower end or section of the carrier plate. In particular, the rest elements may be provided, positioned and/or attached to or at respective mounting sections of the carrier plate, which may at least partially project from the carrier plate in axial direction. The mounting sections preferably are arranged at least one of centered to the carrier plate and symmetric to the axial center line of the carrier plate.

In a further variant, the shoulder rest element is in the form of a plate having two butterfly-like wings. The wings preferably and respectively comprise strap holes adapted to thread through a shoulder strap. In a canter position between the wings a swing bearing or swing axis may be provided adapted to pivotably attach the shoulder rest to the carrier plate with a pivot axis being parallel to the normal direction of the carrier plate.

In a yet further variant the waist rest element is in the form of a belt having two laterally extending limbs adapted for resting against a waist or hip area of a user. It is preferred that the limbs of the waist rest element respectively comprise strap loops adapted to thread through a waist strap or respective waist straps.

In a further variant, in particular in connection with rotatable, in particular pivotable and/or swiveable, rest elements, the carrier system further comprises at least one rotation limiter adapted to limit a freedom of rotation of the at least one rest element. Such a rotation limiter may for example be implemented in a rotary bearing, live ring or swing bearing. In particular in these cases, the at least one rotation limiter can comprise stop elements with stop faces implemented at counterpart bearing elements. In the alternative or additionally, the rotation limiter may comprise a pin, in particular grommet, and guide-hole type swing lock.

The swing lock may comprise pins, or grommets, passing through and guided in oblong guide holes. Such a swing lock may be implemented such that the respective rest element can be mounted in a floating manner to the carrier plate. Float-mounting the rest element may be advantageous to compensate or balance movements of the user, in particular with respect to the comparatively rigid carrier plate.

According to claim 13, an energy source is provided which comprises a housing accommodating therein at least one cell. The at least one cell preferably is a storage cell of a battery pack. However, other cell-types for storing electric energy and/or for generating electric energy, such as fuel cells, may be used. The proposed energy source comprises a counter coupling interface adapted to be coupled to a coupling interface of a carrier system according to any of the embodiments and variants described above and further above.

In particular, the energy source, in particular the housing of the energy source may comprise counter latching elements, in particular counter hook elements, adapted to engage corresponding latching elements provided on or at the carrier interface. Note that the latching elements, in particular hook elements may also be provided at the battery pack, in particular counter coupling interface, and the counter latching elements, such as latching grooves or recesses, may be provided at the carrier plate, in particular coupling interface.

In an embodiment, the energy source comprises a central handle protruding from an upper side of the energy source. The term upper side in this case shall relate to the configuration in which the energy source is coupled to the carrier plate and the corresponding carrier system is in its position of ordinary use. The term upper in this case in particular refers to the vertical direction. The handle preferably is implemented at the housing. The handle may be composed of two halfs respectively being part of a half-shell of the housing.

The handle preferably is implemented at the housing in such a way that, when coupled to the carrier plate, it is spaced from the carrier plate in normal direction of the carrier plate. In this case, the handle can be used to carry the energy source, but also to carry the energy source and carrier system coupled together.

In a preferred embodiment of the energy source, the energy source comprises an energy outlet port protruding from the energy source, in particular from the housing of the energy source in lateral direction. This in particular shall mean that the energy outlet port protrudes from a lateral side of the energy source and housing, respectively.

The energy outlet port may be a of cable leaded or guided from the cells of the energy source or electronics thereof to the outside of the energy source, and having at its distal end a connector adapted to connect a tool to be driven by the energy source. Implementing the energy outlet port in such a way that it projects in lateral direction from the energy source has been found to be of great advantage for conveniently operating the energy source place on the back of the user.

In particular laterally extending connectors are easily accessible and can be easily reached by the user. Further, lateral extending connectors, in particular connector stumps, have been found to provide optimal mobility for tools driven via the energy source.

In connection with the energy outlet port it is preferred that the energy outlet port is adapted to be freely movable between the energy source lateral sides at least in the state disconnected or uncoupled from the carrier plate. In more detail, it is preferred that the energy outlet port can be positioned in such a way that it can extend and protrude from either lateral sides of the energy source, in particular housing. For this purpose, the energy outlet port may be, at least in sections, flexible enough to guide the outlet port out from the energy source at lateral sides.

It is also possible that the energy outlet port is swivel connected to the energy source, which in particular shall mean that the energy outlet port can be moved from one lateral side to the other lateral side in a swiveling action. Preferably the swiveling action is only possible in the disconnected state, whereas in the state connected to the carrier plate, swiveling of the energy outlet port is blocked. Note that the possibility of guiding the energy outlet port out of the energy source at both lateral sides is advantageous for adapting a corresponding backpack energy source to left-handed and right-handed persons, respectively.

The energy outlet port may be provided at a lower side or region of the energy source and/or at an upper side or region of the energy source, with respect to the ordinary position of use.

Providing the proposed energy outlet port in particular has the advantage that the user can put the energy source, in particular battery pack, on the ground without damaging the outlet port. The user can use the cable at both lateral sides without the danger of bending down the cable. This in particular may be obtained by a cable guide integrated in the housing bottom and/or housing top. As already indicated, the cable outlet can be designed on different positions, i.e. at the bottom or at the top of the battery pack, or housing of the same, such that the user in particular can select the best position according to respective operational needs.

Providing the outlet port in particular may bring a respective male/female connector at the end of the outlet port to the field of view of the user, easing connection with counterpart female/male connectors. Further, with lateral outlet ports, it is possible to reduce the overall cable length between battery pack and tool to be driven, because it is possible to guide the cable on a more direct way to the user or application or tool.

According to one embodiment, a backpack energy source assembly is provided, comprising an energy source as described in any embodiment and variant beforehand, and further comprising a carrier system according to any embodiment and variant described above and further above, wherein the counter coupling interface of the energy source is exchangeably coupled to the coupling interface of the carrier system. Advantages and advantageous effects of the backpack energy source assembly in particular result from the description above and further above.

The backpack energy source assembly according to the invention can be used with any electrically operated handheld devices, in particular power tools such as hedge trimmers, clearing saws, chain saws, brush cutters, trimmers, blowers, screw drivers, drills, hammer drills, nailers, staplers, polishing or grinding tools, etc.

All features described and/or claimed herein (in this application) can be claimed separately or in arbitrary combination regardless of what is claimed in the claims at present. The applicant reserves all rights to claim any subject-matter comprising one or more or an arbitrary combination of the features described and/or claimed herein, in particular the right to file a divisional application on such subject-matter.

Selected embodiments of the invention will now be described in connection with the annexed figures, in which:

FIG. 9 shows a fifth plan view of the carrier plate together with a waist rest element;

FIG. 10 shows sixth plan view of the carrier plate together with the waist rest element;

FIG. 13 shows a plan view of the carrier plate together with the waist rest element and the shoulder rest element in an idle configuration;

FIG. 14 shows a plan view of the carrier plate together with the waist rest element and the shoulder rest element in a twisted configuration;

Figure 17:
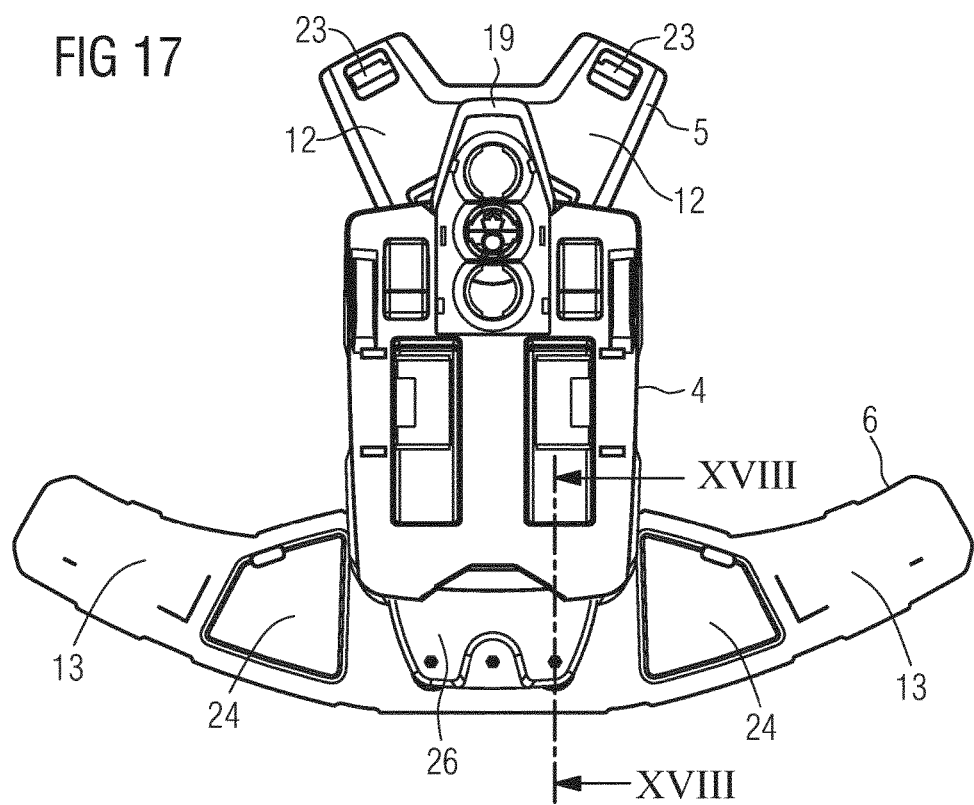
FIG. 17 shows a plan view of the carrier plate 4 together with the shoulder rest element and waist rest element in a different variant.
Figure 19:
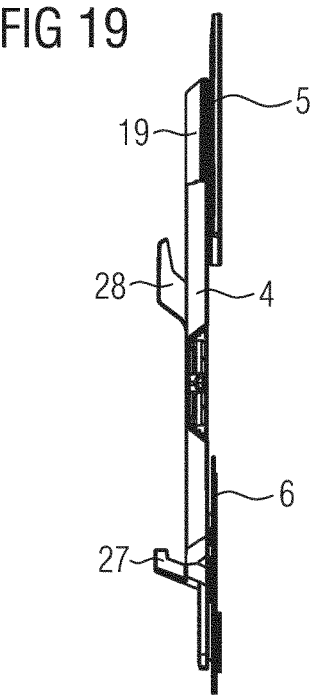
Figure 20:
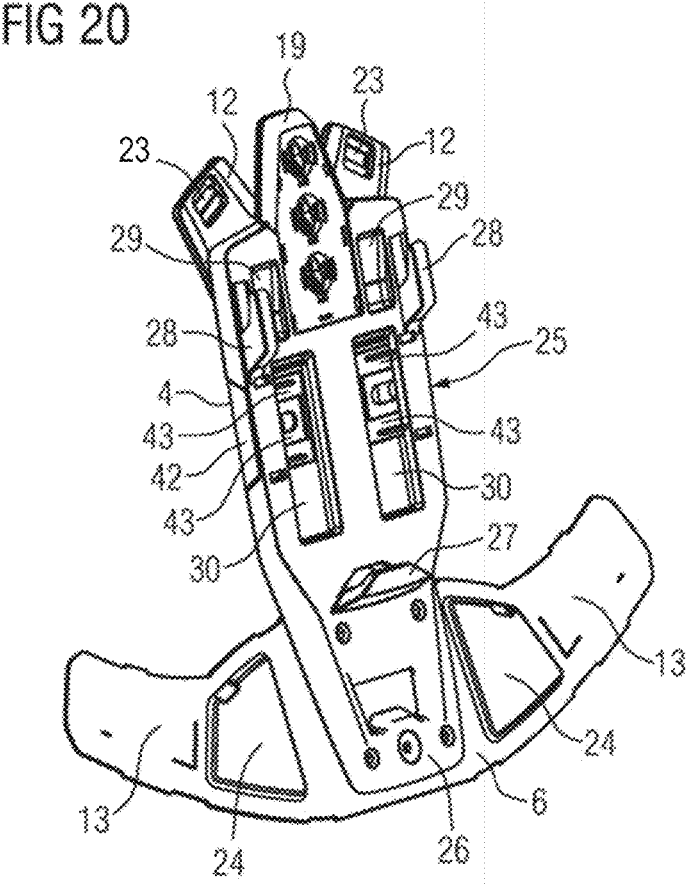
Figure 21:
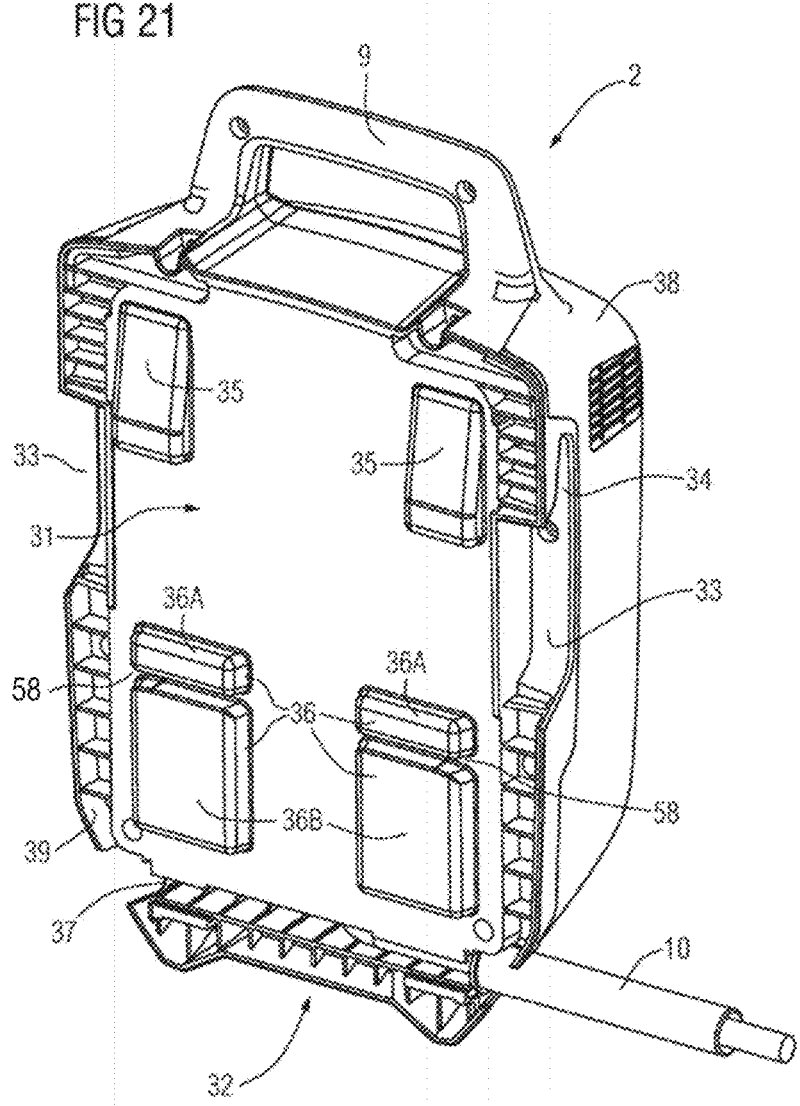
Figure 22:
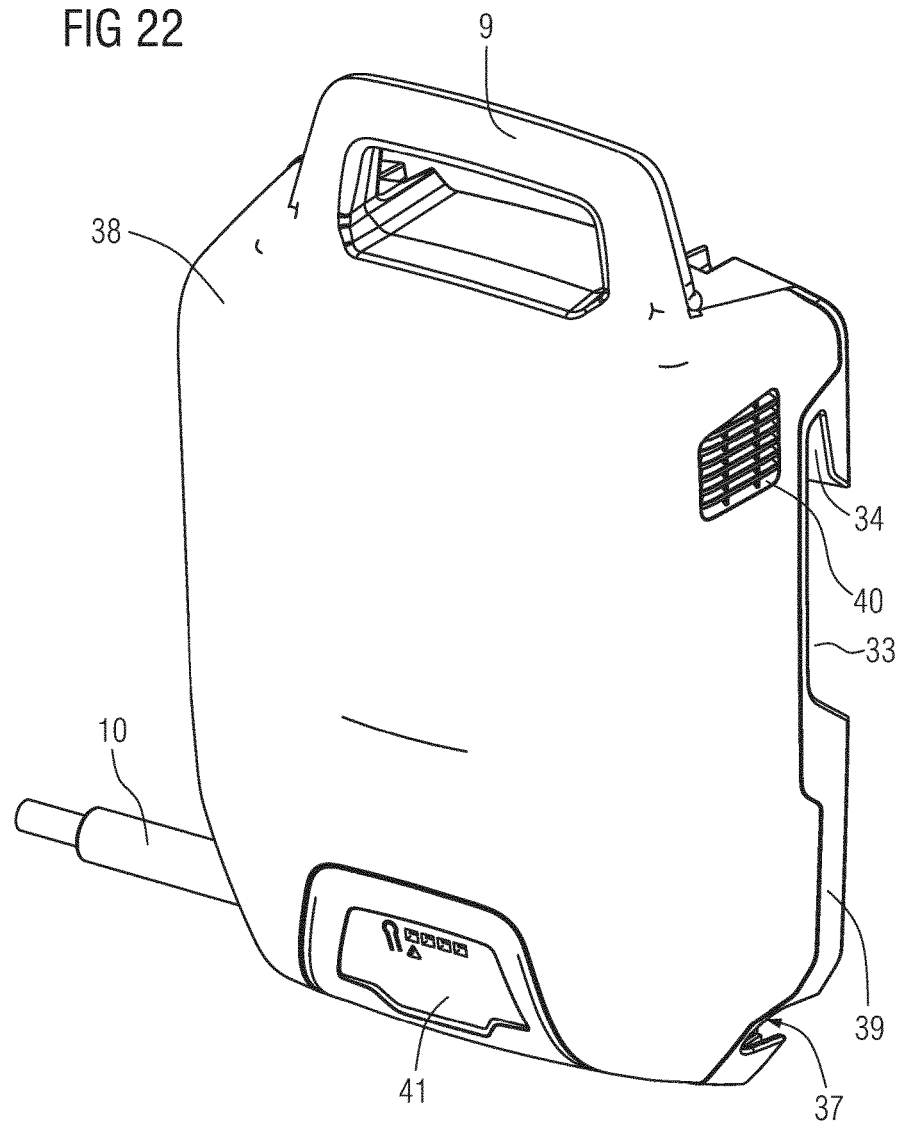
Figure 23:
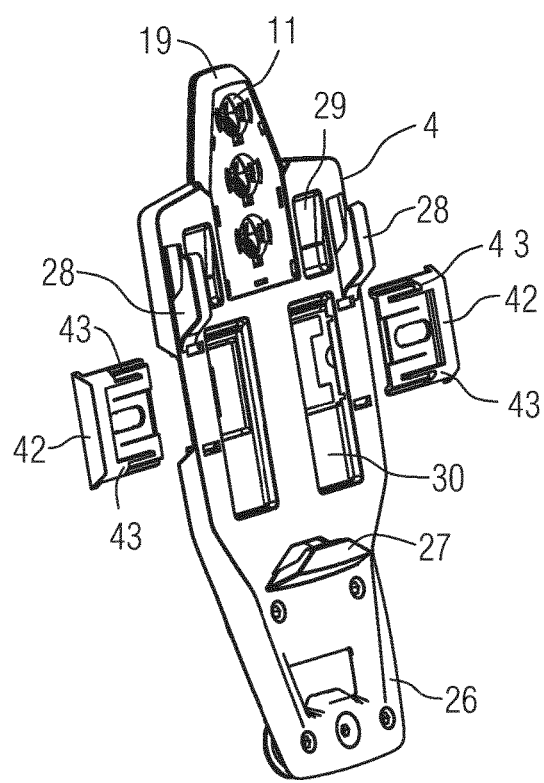
Figure 24:
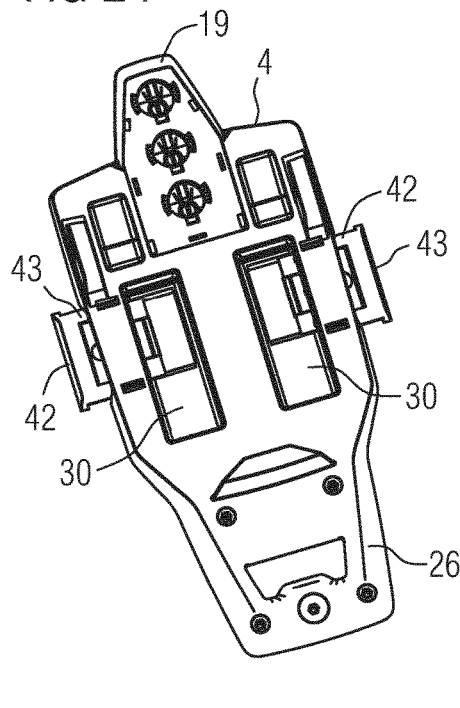
Figure 25:
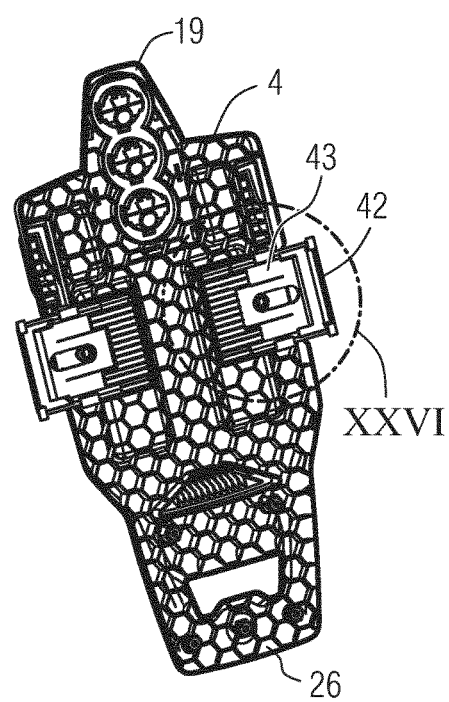
Figure 26:
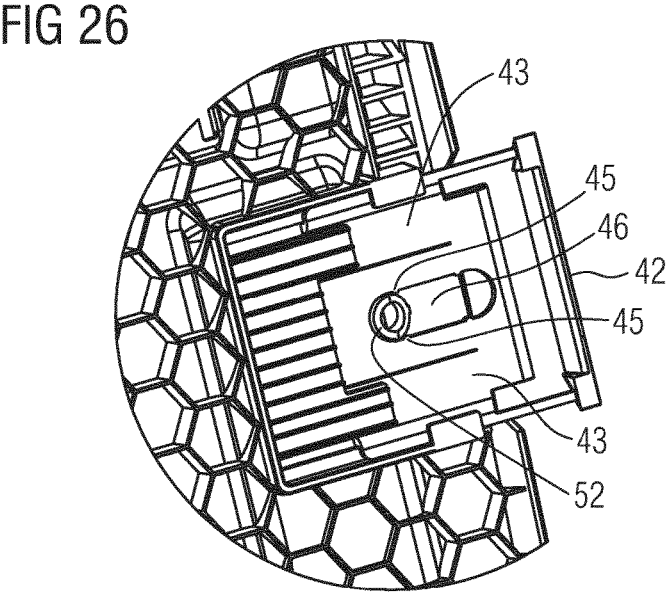
Figure 27:
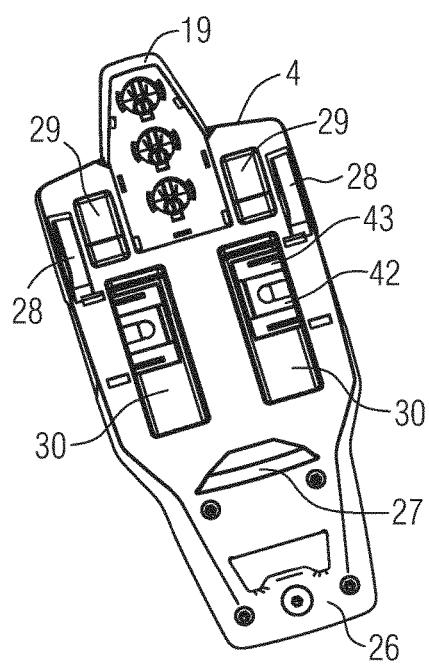
Figure 28:
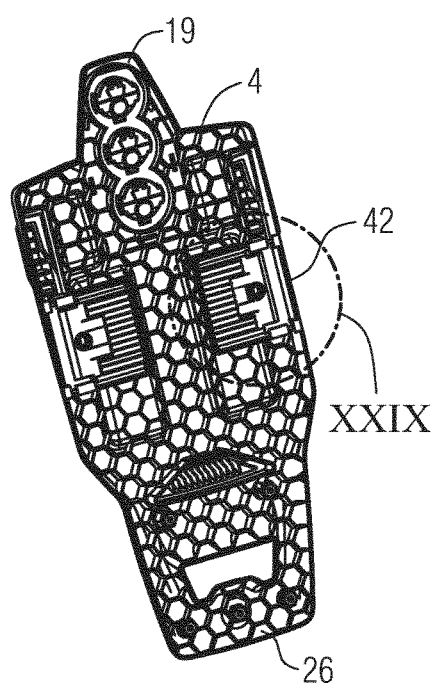
Figure 29:
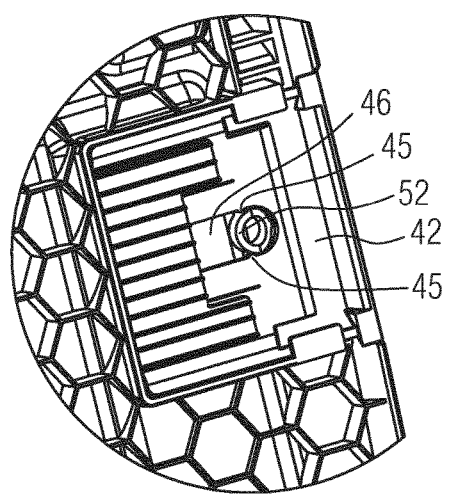
Figure 30:
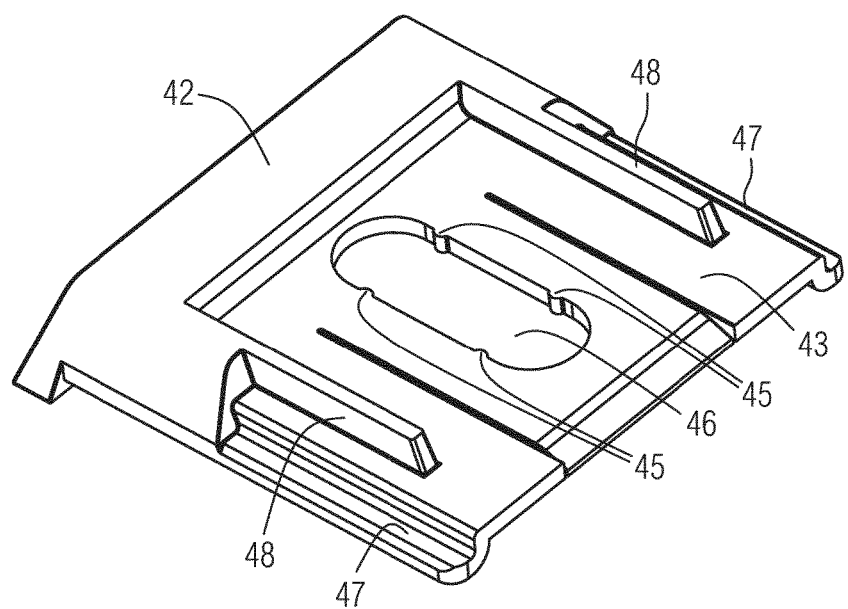
Figure 31:
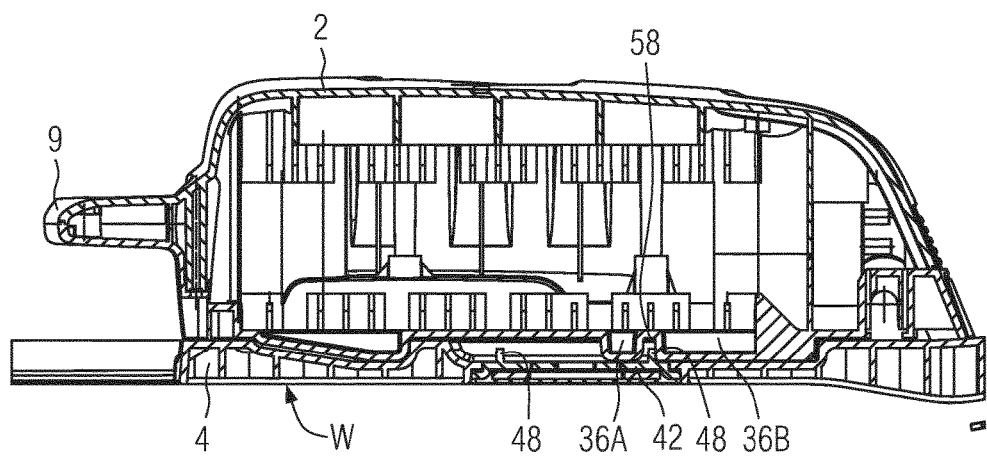
Figure 32:
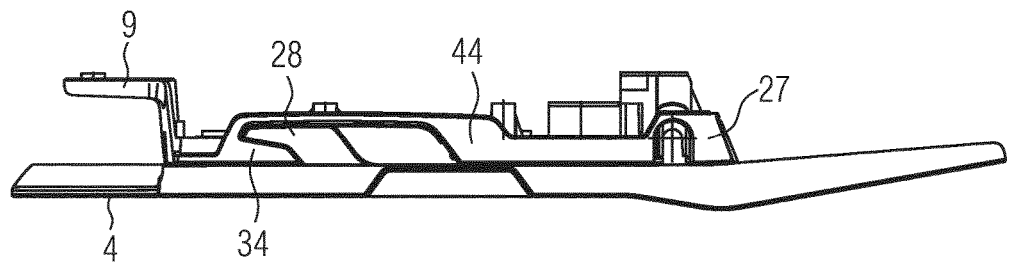
Figure 33:
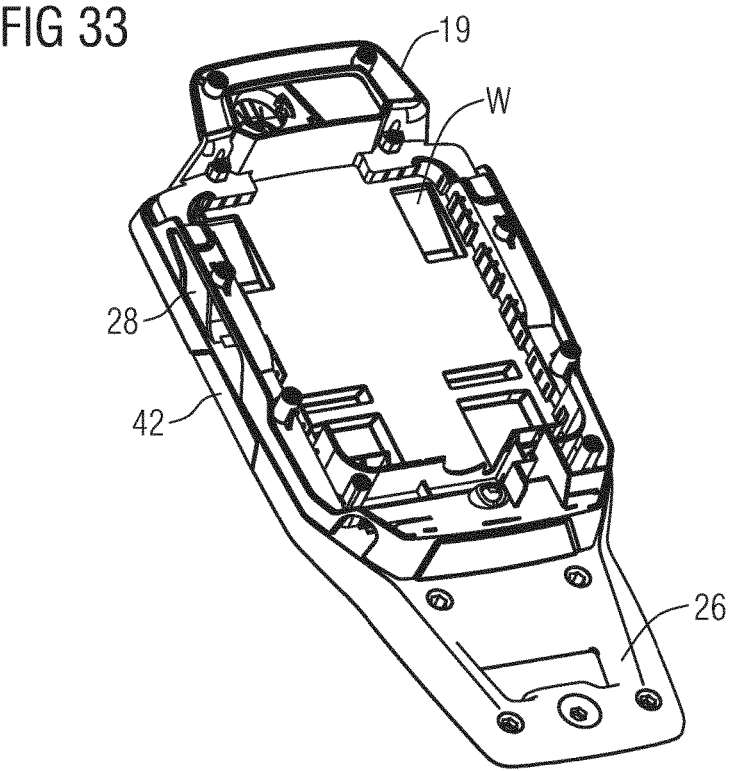

FIG. 19 sows a second cross sectional view according to line A-A in FIG. 17;

FIG. 20 shows a perspective view of a coupling interface of a carrier system;

FIG. 21 shows a perspective view of a counter coupling interface of the energy source;

FIG. 22 shows a perspective view of the energy source;

FIG. 23 shows a perspective and partially exploded view of the carrier plate;

FIG. 24 shows a perspective view of the carrier plate of FIG. 23 with locking elements in an unlocking position;

FIG. 25 shows a different perspective view of the carrier plate of FIG. 23 with locking elements in an unlocking position;

FIG. 26 shows a detail in FIG. 25;

FIG. 27 shows a perspective view of the carrier plate of FIG. 23 with locking elements in a locking position;

FIG. 28 shows a different perspective view of the carrier plate of FIG. 23 with locking elements in an locking position;

FIG. 29 shows a detail of the locking mechanism in FIG. 28;

FIG. 30 shows a cross sectional view of the energy source and corresponding housing;

FIG. 31 shows a sectional view of the carrier plate and a half shell of the housing of the energy source;

FIG. 32 shows a perspective view of the carrier plate and a half shell of the housing of the energy source;

FIG. 33 shows the energy source 2 from a bottom view; and

Figure 34:
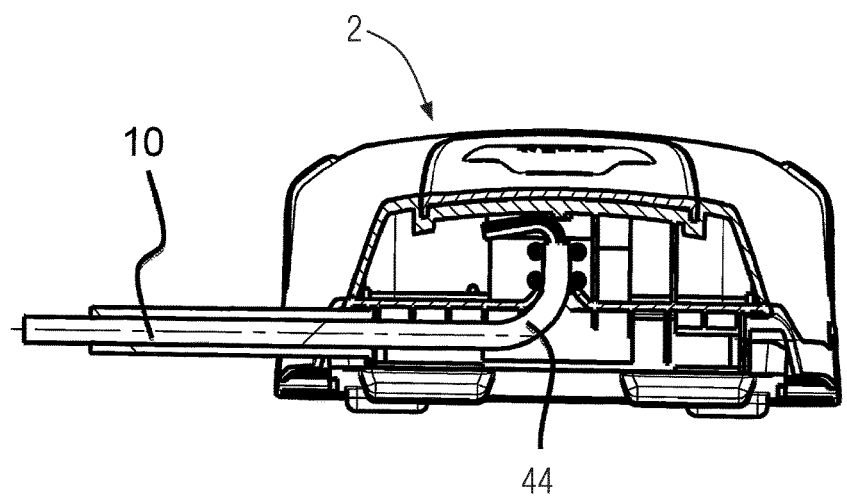

FIG. 34 shows a perspective view of a locking element.

Figure 1:
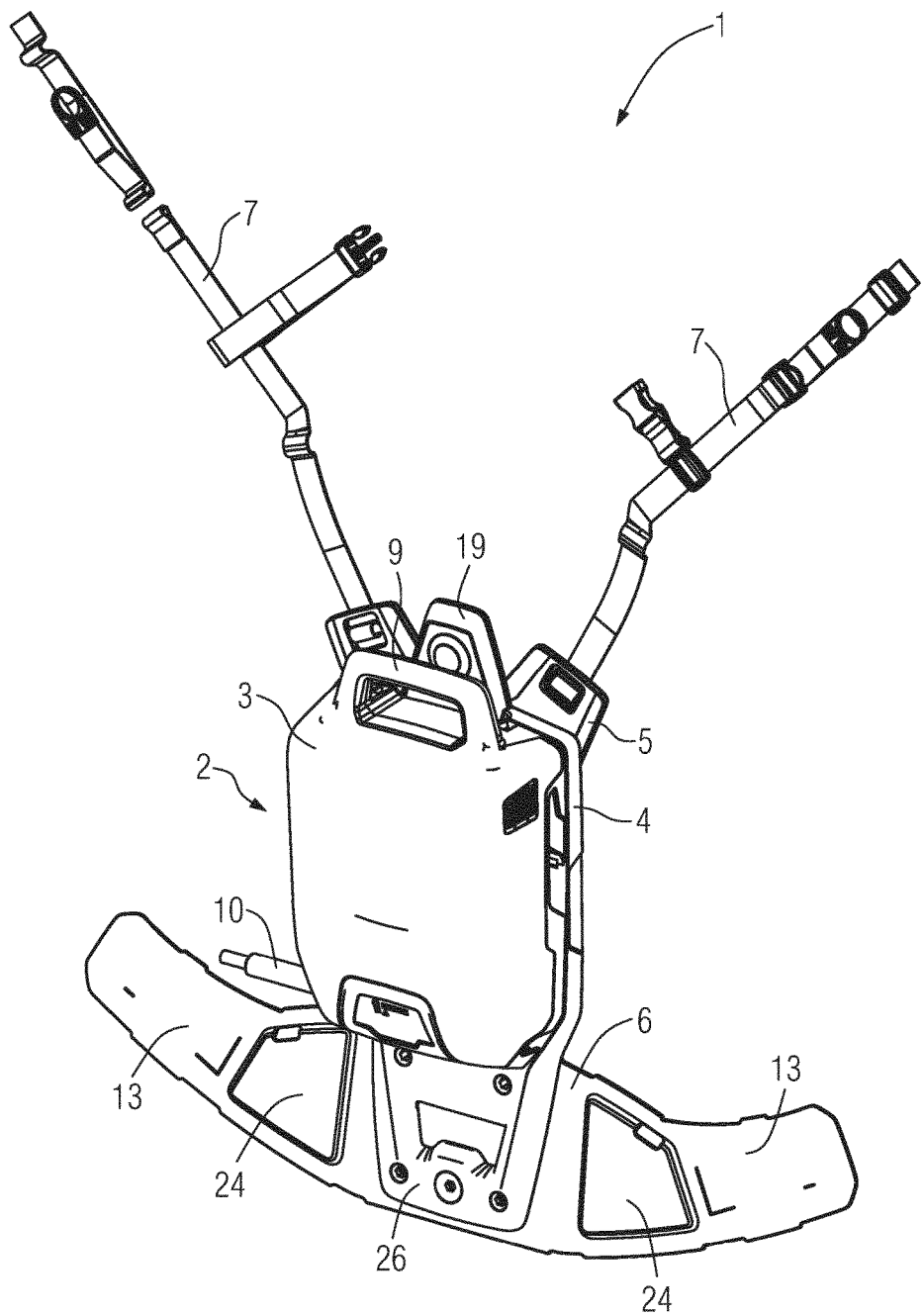
FIG. 1 shows a perspective view of a backpack energy source assembly

FIG. 1 shows a perspective view of a backpack energy source assembly 1. The backpack energy source assembly 1, which is implemented to carry an energy source such as a battery pack in a backpack or rucksack type manner, comprises an energy source 2 having a housing 3 accommodating therein a plurality of accumulator cells, in particular NiMH or Li-ion cells. The energy source 2 is coupled to a carrier plate 4 of a carrier system.

The carrier system, as far as can be seen from FIG. 1, comprises, apart from the carrier plate 4, a shoulder rest element or shoulder strap connector 5 and a waist rest element or waist strap connector 6. Shoulder straps 7 are connected to the shoulder strap connector 5, and waist straps (not shown) are connected to the waist strap connector 6 which is implemented as a type of belt, in particular waist belt of larger width. The shoulder straps 7 and waist straps are adapted to be fitted around the shoulder and waist of a user, respectively, such that the backpack energy source assembly 1 can be securely fixed and carried on the back of a user. A waist belt has the advantage, that most of the weight of the energy source 2, in particular about 70%, is worn on the hip of the user, which clearly is more comfortable to the user.

The energy source 2, in more detail the housing 3, comprises a central handle 9 projecting from the upper side of the housing 3 and being spaced from the carrier plate 4 in normal direction thereof. The handle thus can be used to carry the energy source 2 as such, but also to carry the backpack energy source as a whole.

The energy source 2 further comprises an energy outlet port 10 projecting from a lateral side of the energy source. The energy outlet port 10 in the present case is implemented as a comparatively rigid stump, having a connector for connecting a electric driven tool at its distal end.

As can be seen, the backpack energy source is of compact design, can comparatively easily be strapped to the back of a user and allows operation, in particular prolonged operation, of electric driven tools, in particular handheld working tools.

Figure 2:
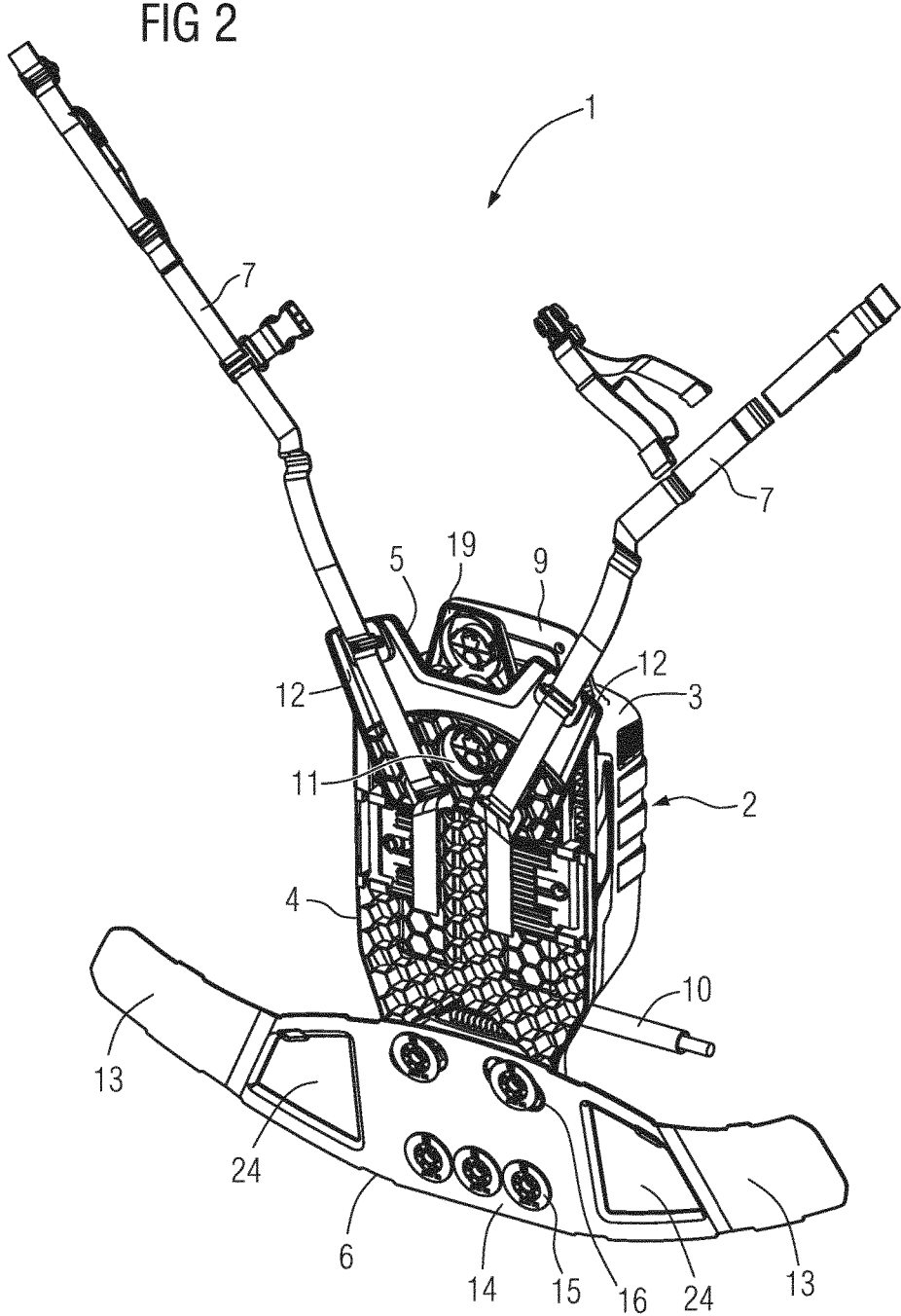
FIG. 2 shows the backpack energy source assembly in a different perspective view.

FIG. 2 shows the backpack energy source in a different perspective view. FIG. 2 in particular shows a side of the backpack energy source assembly 1, in particular carrier plate 4, intended to be placed and to face the back of the user during use. In the present case, the carrier plate 4 comprises stiffening structure having a plurality of bars, fins and/or ribs constituting a honeycomb structure.

Openings of the honeycomb structure open towards the side facing the back of the user. Advantages of the stiffening structure, in particular honeycomb structure, may be two-fold. On the one hand, a honeycomb structure provides enhanced stability. On the other hand, the honeycomb structure, in particular openings in normal direction of the carrier plate 4 provide or contribute to aeration of the space between the carrier plate 4 and the user's back. Hence perspiration can be reduced and wear comfort can be enhanced.

From FIG. 2 it can also be seen that the shoulder rest, i.e. shoulder strap connector 5 is connected via a swing bearing 11 at an upper region to the carrier plate 4. An axis of the swing bearing 11 is oriented essentially normal to the carrier plate 4. Hence, the shoulder strap connector 5 can be swung or rotated in a plane essentially parallel to the carrier plate 4. Providing a rotatable shoulder strap connector 5 may be advantageous for compensating or balancing movements of the user carrying the backpack energy source assembly 1 on its back.

The shoulder strap connector 5 in the present configuration comprises two butterfly-type wings 12. Each of the butterfly-type wings 12 comprises strap holes adapted to thread through and fix the shoulder straps 7. Ends of the shoulder straps 7 remote from the shoulder strap connector 5 may comprise clasps adapted to be fixed or fastened to the carrier plate 4, for example.

The waist strap connector 6 or waist belt is attached at a lower portion of the carrier plate. Two limbs 13 adapted for resting against the waist area of a user extend from a central portion 14 of the waist belt 6. The central portion 14 is used for connecting the waist belt 6 to the carrier plate 4. In the present case, the waist belt 6 is attached to the carrier plate 4 via a swing lock comprising several pins, in the present case grommets 15. The grommets 15 may pass through guiding holes 16, in particular curved long holes 16, wherein the long holes 16 provide a floating mount of the waist belt 6 to the carrier plate in a plane essentially parallel to the carrier plate 4. A floating mount can thus be implemented to compensate or balance movements of the user carrying the backpack energy source assembly 1 on its back.

Figure 3:
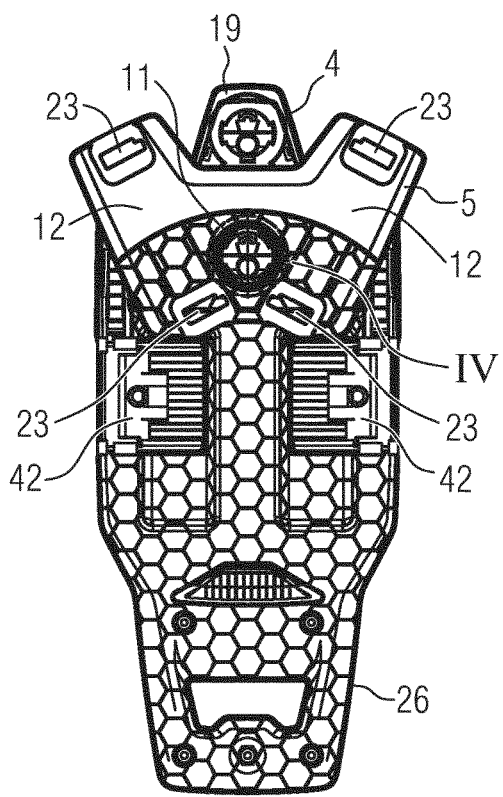
FIG. 3 shows a first plan view of the carrier plate together with shoulder rest element.

FIG. 3 shows a first plan view of the carrier plate 4 and shoulder rest element 5 connected thereto. Note that the carrier plate 4 and shoulder rest element 5 are viewed from a side resting on a user's back during ordinary operation.

Figure 5:
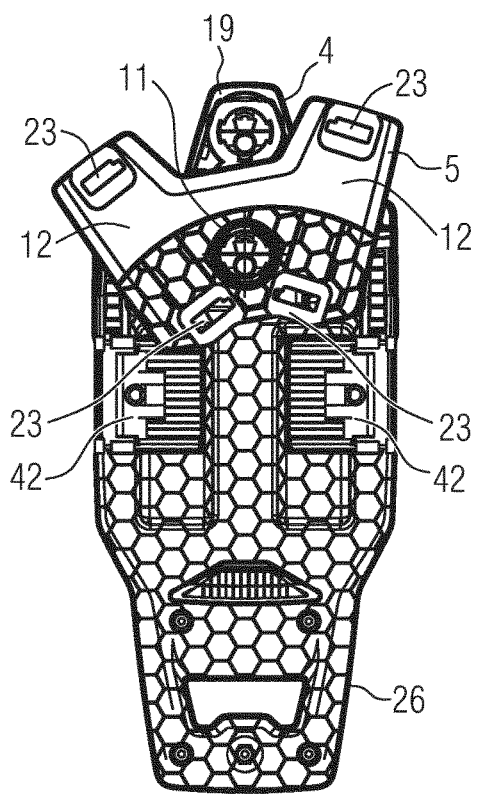
FIG. 5 shows a second plan view of the carrier plate together with shoulder rest element.
Figure 4:
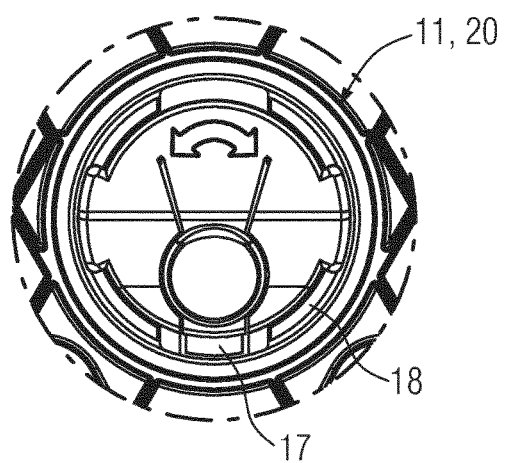
FIG. 4 shows a detail of FIG. 3.

The shoulder rest element 5 is connected via a swing bearing 11. In FIG. 4 a section, i.e. the swing bearing 11, is shown in more detail. As can be seen, the swing bearing comprises a rotation limiter with first and second rotation stop elements 17 and 18. The first rotation stop element/s 17 is/are implemented at the carrier plate part of the swing bearing 11. The second rotation stop element/s 18 is/are implemented at the shoulder rest part of the swivel bearing 11. The first and second rotation stop elements 17, 18 comprise corresponding stop, i.e. abutment, faces, abutting against each other and restricting the rotational degree of freedom of the shoulder rest element 5, which is indicated in FIG. 4 by a double arrow. FIG. 5 shows a second plan view of the carrier plate 4 and shoulder rest element 5, in which the shoulder rest element 5 is rotated, i.e. swiveled to its outermost left position. Restricting the rotational freedom of the shoulder rest element 5 has the advantage of avoiding twisted conditions of the shoulder straps 7. Note that the elements of the swivel bearing 11, rotation stop elements 17, 18 can in principle be implemented at any of the carrier plate 4 and shoulder rest element 5. This means that the arrangement of the mentioned elements as shown in the figures, in particular in FIG. 4, can be reversed.

Figure 6:
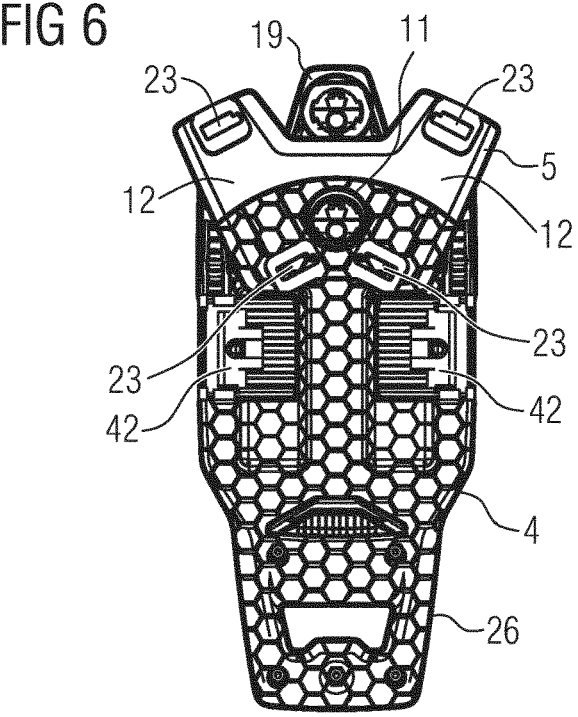
FIG. 6 shows a third plan view of the carrier plate together with the shoulder rest element.
Figure 7:
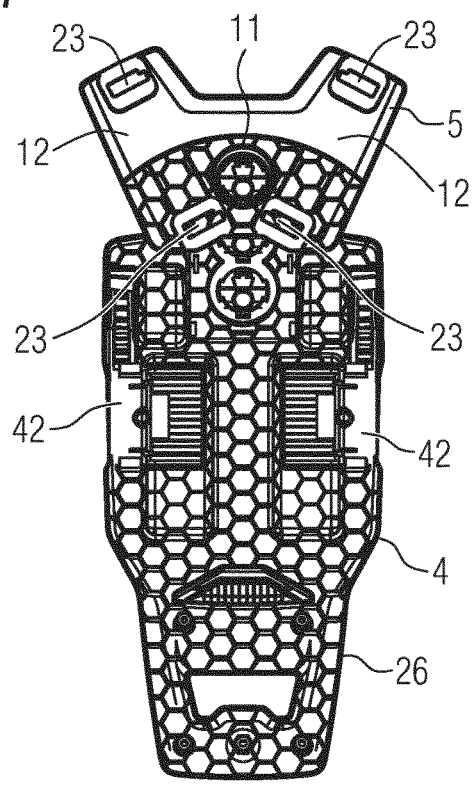
FIG. 7 shows fourth plan view of the carrier plate together with the shoulder rest element.
Figure 8:
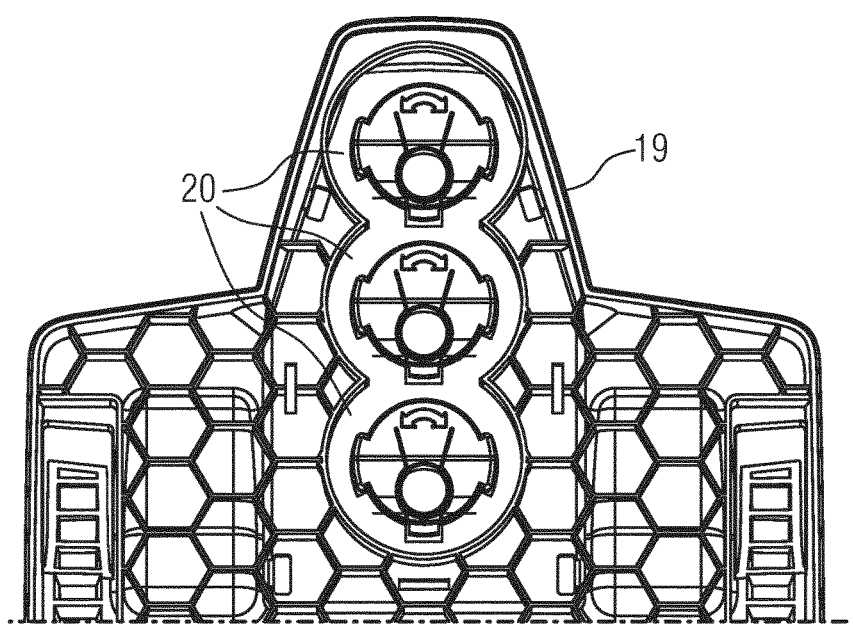
FIG. 8 shows a plan view of a detail of the carrier plate.

FIG. 6 shows a third plan view of the carrier plate 4 together with the shoulder rest element 5. In the configuration shown in FIG. 6, the shoulder rest element 5, in more detail a respective part of the swing bearing 11 is connected to a lower counterpart swing bearing section on the carrier plate 4. In FIG. 7, showing a fourth plan view of the carrier plate 4 together with the shoulder rest element 5, the part of the swing bearing 11 of the shoulder rest element 5 is connected to an upper counterpart swing bearing section on the carrier plate 4. As can be seen in FIG. 8 showing a plan view of a detail of the carrier plate 4, the carrier plate 4 comprises an upper connector section 19, at least partially being implemented as an extension of the carrier plate 4. The upper connector section 19 in the present case comprises three counterpart swing bearing sections 20 respectively adapted to be coupled with a swing bearing section of the shoulder rest element 5. Note that respective stop elements are indicated by double arrows.

The counterpart swing bearing sections 20 are placed above each other in axial direction of the carrier plate 4. In this way, it is possible to adjust and position of the shoulder rest element 5 in dependence of the size of the user, in turn leading to enhanced wear comfort. In the present case, the swing bearing sections 20 provided at different preset height positions, allow a stepwise size adaptation of the carrier system, in particular carrier plate 4. However it is also possible to provide counterpart swing bearing sections at the carrier plate 4 allowing a continuous size adaptation. In particular, it may be provided that a counterpart swing bearing section is moveable at least within a certain range in axial direction of the carrier plate 4.

FIG. 9 shows a fifth plan view of the carrier plate 4 together with a waist rest element 6. The waist rest element 6 or waist belt is attached to the carrier plate 4 via a grommet and guide-hole, in particular long hole 16, connector mechanism. The long or guide holes 16 provided in the waist belt 6 provide a floating mount with different pivotal positions, but also restrict a pivotal motion of the waist belt 6 relative to the carrier plate 4. FIG. 10 shows a situation in which the waist belt 6 is rotated to the outmost position in counter-clockwise direction. The floating mount provided with the waist belt is advantageous for balancing movements of the user, in turn greatly enhancing wear comfort.

Figure 11:
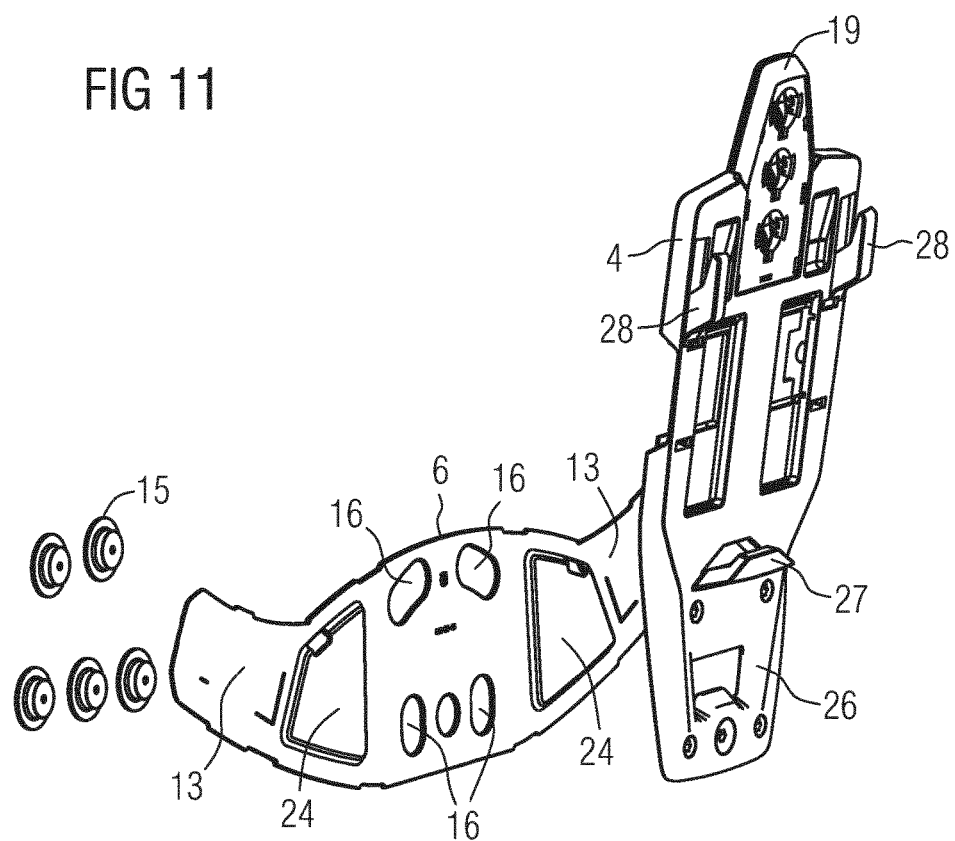
FIG. 11 shows an exploded view of the carrier plate together with the waist rest element.
Figure 12:
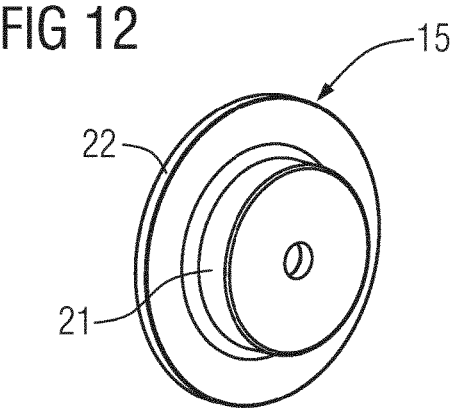
FIG. 12 shows a detail of a grommet.

It shall be noted, that the proposed floating pin and guide-hole type attachment which can be seen in more detail in the exploded view of FIG. 11 is advantageous for receiving and distributing the loads imposed by the energy source 2, i.e. battery pack. In particular, the waist belt 6 is fastened to the carrier plate 4 via several, in the present case five, grommets 15. The grommets 15 pass through guiding holes 16, wherein a cylinder type section 21 (see FIG. 12) of the grommet 15 is adapted to tightly fit through respective guiding holes 16. The grommet 15 further comprises a disc cap 22 preventing the grommets 15 from slipping out of the guiding holes 16.

As can be seen from FIG. 11, a central guiding hole 16 is implemented as a circular hole with a diameter essentially corresponding to the diameter of the cylinder type section 21 of the grommet 15 (shown in FIG. 12), and therefore acting as a rotational or pivot axis of the waist belt 6. However, other types of attachment, in particular floating type attachments, may be provided.

FIG. 13 shows a plan view of the carrier plate 4 together with the waist rest element 6, i.e. waist belt, and shoulder rest element 5 in an idle configuration. In this configuration, both the waist belt 6 and shoulder rest element 5 are not twisted or rotated relative to the carrier plate 4. This mutual arrangement may correspond to the situation in which a user carrying the backpack energy source assembly 1 has an upright or straight posture.

In FIG. 14, showing the carrier plate together with the waist rest element and the shoulder rest element in a twisted configuration, the shoulder rest element 5 is rotated in clockwise direction and the waist belt 6 is rotated in counter clockwise direction. This mutual arrangement may correspond to a situation in which a user carrying the backpack energy source assembly 1 on his back, bends its upper body or chest to the left. As can be seen, the waist rest element 6 and shoulder rest element 5 to some extent balance and compensate movements of the user, which results in enhanced wear comfort.

Figure 15:
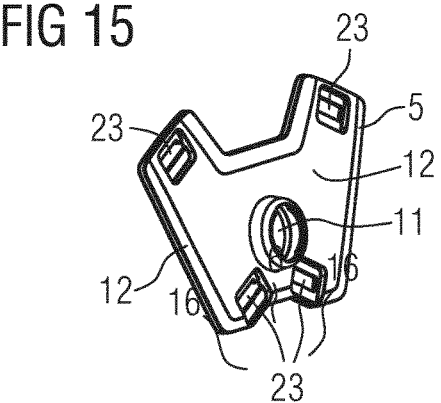
FIG. 15 shows a perspective view of the shoulder rest element.
Figure 16:
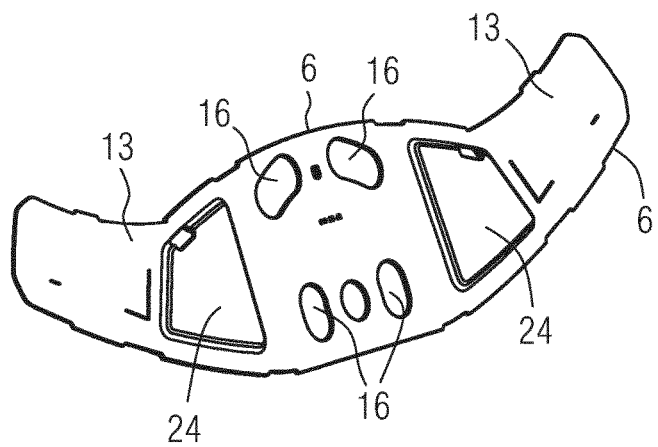
FIG. 16 shows a perspective view of the waist rest element.

In FIG. 15 and FIG. 16, the shoulder rest element 5 and waist rest element 6 are shown in perspective views of sides abutting or facing the carrier plate 4 in the assembled state.

From FIG. 15, the butterfly type wings 12 and the part of the swing bearing 11 of the shoulder rest element 5, which is arranged in the center between the wings 12, can be seen. Also it can be seen that each wing 12 comprises a pair of strap holes 23 serving to tightly and extendably attach the shoulder straps 7 to the shoulder rest element 5, also called shoulder strap connector.

From FIG. 16 it can be seen that the waist belt 6 on each side adjacent to the central region providing the guiding holes comprises a limb 13 for attaching a waist strap thereto. The limbs 13 in the present case have a cutout 24 enhancing aeration of the waist region below the waist belt 6, which enhances wear comfort.

FIG. 17 shows a plan view of the carrier plate 4 together with the shoulder rest element 5 and the waist rest element 6 in a variant. In this variant, it is provided that the waist rest element 6 is pivotable or swivelable relative or around an axis running parallel to the transversal direction, i.e. perpendicular to the axial or longitudinal direction of the carrier plate 4. Providing a swiveling movement is advantageous for adjusting respective contact surfaces to the body structure of the user. Further, it is possible to balance and compensate forth-to-back and vice versa movements of the upper body or waist, of a user carrying the backpack energy source assembly 1 on his back.

Figure 18:
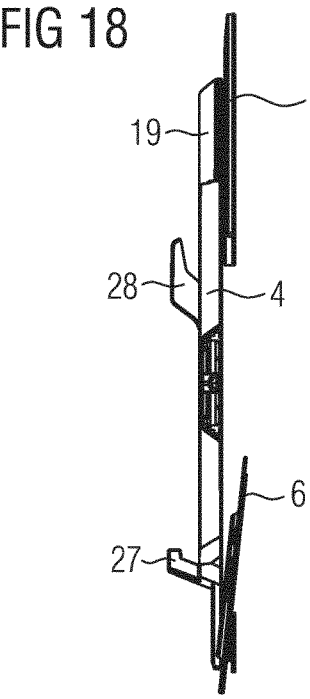
FIG. 18 shows a first cross sectional view according to line A-A in FIG. 17.

As can be seen from the cross sectional views in FIGS. 18 and 19, the waist rest element 6 in the configuration in FIG. 18 is twisted away from the carrier plate 4, and in the configuration in FIG. 19 it is twisted towards and abuts the carrier plate 4. Note that in a similar way, also the shoulder rest element 5 may be attached pivotably or swivelably relative to the carrier plate 4 around an axis running parallel to the transversal axis or direction of the carrier plate 4.

FIG. 20 shows a perspective view of a coupling interface 25 of the carrier plate 4. The coupling interface 25 is adapted and implemented to being exchangeably coupled to a counter coupling interface of the energy source 2.

Only for the reasons of completeness, it shall be mentioned, that the shoulder rest element 5 and the waist rest element 6 are mounted to respective mounting sections 19, 26 at least partially being implemented as extensions of the carrier plate 4. It shall further be noted that providing respective mounting sections 19, 26 at least partially on extensions of the carrier plate 4 is advantageous for adapting the carrier system to the human body structure.

As can be recognized throughout the figures, the carrier plate 4 comprises a central platform on or at which the coupling interface 25 or connector interface is implemented. The central platform comprises elements for removably attaching the energy source 2 to the carrier plate 4 and for attaching the carrier plate 4 on the back of a user. Elements for attaching the carrier plate 4 on the back of the user are at least partially designed as extensions or protrusions of the central platform. The central platform as such has a rectangular shaped basic design. The extensions are preferably positioned in a symmetric arrangement on the center axis of the central platform, and in lateral dimensions are narrower than the central platform of the carrier plate 4.

The coupling interface 25 in the present embodiment comprises a central lower hook 27 and two lateral upper hooks 28. The hooks in particular constitute latching elements for latching the energy source 2 to the carrier plate 4. Openings of the hooks 27, 28 are directed towards the upper side of the carrier plate 4.

Further, the coupling interface comprises upper and lower positioning and guiding recesses 29, 30. Together with the hooks 27 and 28, the positioning and guiding recesses 29 and 30 constitute a linear slide and latch mechanism, in which the energy source 2 can be coupled to the carrier plate 4 in a translational, in particular linear sliding motion, running essentially parallel to the carrier plate 4, which will be explained in more detail further below.

FIG. 21 shows a perspective view of a counter coupling interface 31 of the energy source 2. The counter coupling interface 31 comprises, in accordance with the coupling interface 25, a lower central counter hook element 32 adapted to engage with the lower central hook 27 of the carrier plate. Further, the counter coupling interface 31 comprises two upper counter hook elements 33. The upper hook elements 33, in the present case are implemented as lateral depressions with undercuts 34 at upper ends, adapted to receive hook ends of respective lateral upper hooks 28.

In addition, the counter coupling interface 31 comprises upper 35 and lower elevations 36. The upper 35 and lower 36 elevations are adapted and designed to be guided in the upper 29 and lower positioning and guiding recesses 30 of the carrier plate 4, respectively. Between one smaller lower elevation 36A and one larger lower elevation 36B on each side a gap is formed serving as a locking groove 58 which will be explained later.

As becomes obvious in particular from FIGS. 20 and 21, the energy source 2 can be coupled to the carrier plate 4 in a linear sliding motion directed top-down. For coupling the energy source 2 to the carrier plate 4, the energy source 2 is first put on the carrier plate 4 such that the elevations 35, 36 and recesses 29, 30 at least partially engage. In this state, the energy source 2 and carrier plate 4 are laterally aligned. In a subsequent step, the energy source 2 is moved relative to the carrier plate 4, in the present case in a direction top-down, such that the hooks 27, 28, as end-stops, engage in a linear sliding motion, directed essentially parallel to the carrier plate 4, respective counter hook elements 32, 33. By implementing respective interacting faces of the hooks 27, 28 and counter hook elements 32, 33 to be slanted to each other, it is possible that the energy source 2 and carrier plate 4 are automatically urged or pressed together during the coupling action.

Further reference is made to FIG. 31 showing a side view of the carrier plate 4 and a half shell of the housing 3. From FIG. 31 it can in particular be seen, that the upper lateral hooks 28 tightly engage respective undercuts 34, in particular in such a way that the housing, in the present case the half shell, is urged towards the carrier plate 4. The same situation is shown in a perspective view in FIG. 32.

It has been found to be of advantage for easing coupling and removing the energy source 2 from the carrier plate 3 if the recesses 29, 30 and/or elevations 35, 36 at least partially have wedged surfaces. As to the wedged surfaces, reference is also made to FIG. 32.

In the present case, in particular with reference to FIGS. 20 and 21, it can be seen that the upper positioning and guiding recesses 29 and upper elevations 35 have corresponding wedged surfaces. The wedged surfaces in particular are advantageous in the course of mounting and demounting the energy source 2 from the carrier plate 4. In more detail, if, for example, the energy source 2 is removed from the carrier plate 4 in a linear pulling action, directed bottom-up, the energy source 2, at least in a final stage of the removal action, is raised from the carrier plate 4. In this way, a gap between the carrier plate 4 and energy source 2 is established which may be helpful in removing the energy source 2 from the carrier plate 4. During coupling, i.e. mounting, the energy source 2 to the carrier plate 4, the wedged surfaces may be helpful in that the energy source 2 will abut on the carrier plate 4 only in an advanced state of the coupling action, avoiding twists or jams during sliding the energy source 2 onto the carrier plate 4.

As to the wedged surfaces, further reference is made to FIG. 30 showing a cross sectional view of the energy source 2 and further to FIG. 32. In this cross sectional view, the wedged surfaces are indicated by reference sign W. As can be seen, if the battery pack, i.e. energy source 2, is moved towards the left hand side, the wedged surfaces W will slide against each other and thereby raise the energy source 2 upwards, such that the energy source can be easily removed from the carrier plate. As further becomes apparent, the process of setting the energy source 2 onto the carrier plate 4, which in case of FIG. 30 means a movement towards the right hand side, will include sliding the wedged surfaces W such that the energy source 2 is moved from a raised position, at least in the region of the upper elevations, towards the carrier plate 4. In the finally locked state, the energy source will tightly rest on the carrier plate 4, in particular due to tapered shapes of the hooks 27, 28, urging the energy source 2 towards the carrier plate 4. From FIG. 32 it can be seen or recognized, that if the energy source is moved to or removed from the carrier plate the wedged surfaces W will lead to raise the energy source 2 from the carrier plate 4, which in particular is possible due the tapered shape of the upper lateral hooks 28 and corresponding tapered faces of the undercuts 34.

In particular with reference to FIG. 21 a further feature of the energy source can be seen in more detail. The energy outlet port 10 is guided and clamped in a corresponding channel 37 of the housing 3 of the energy source 2. The channel 37 extends between and opens towards both lateral sides of the housing 3. The energy outlet port 10 in the present configuration is attached rotatably, at least bendably, with a rotation or bending axis running in axial direction of the energy source 2, in particular vertical direction.

The energy outlet port 10 is rotatable to both lateral sides of the energy source 2, which means that in one configuration the energy outlet port 10 extends at the right-hand side and in another configuration the energy outlet port 10 extends at the left-hand side of the energy source 2, in particular backpack energy source assembly 1. This may be advantageous for adapting the backpack energy source to different user modalities of right-handed and left-handed type users. It shall be noted, that the energy exit port 10 may also be provided at different locations of the energy source 2 and carrier plate 4.

Further reference is made to FIG. 33, showing the battery source, i.e. energy source 2 from a bottom view. From this it can be seen, that a left and right sided groove or cable guide is provided in which a cable 44 exiting the battery source can be guided. The guides or grooves have the advantage that the cable 44 can be prevented from inadequate curvatures, in particular in instances when the battery pack is set or put onto the ground.

From FIG. 21 it can further be seen, that the housing 3 of the energy source 2 comprises two half shells, i.e. an upper half shell 38 and a lower half shell 39. The half shells 38, 39 are fixed to each other by screws, for example. Each of the half shells 38, 39 comprises a section of the handle 9 provided for carrying the energy source 2 and, in the connected state, also the backpack energy source 1.

FIG. 22 shows a perspective view of the energy source 2, in more detail a perspective view of the upper half shell 38. The upper half shell 38 may comprise ventilation openings 40, intended for ventilating the inner volume of the housing 3 of the energy source 2, in which battery packs or accumulator packs are positioned. Ventilation of the inner volume may be necessary due to a temperature rise during discharge and/or charging operations of the battery packs.

In connection with heat generated by the energy source 2, it shall be mentioned that the carrier plate 4, to be arranged between the energy source 2 and the user's back, may be effective in shielding the user from excessive heat. If required, active ventilation, in particular using fans and the like, may be provided. In addition, the carrier plate 4 and/or the lower half shell 39 may comprise elements for blocking, at least greatly blocking, heat transfer from the energy source 2, in particular battery packs, to the user.

The upper shell 38, as can be seen from FIG. 22, further may comprise a display element 41, adapted to display to a user information or parameter/s relating to the energy source, in particular battery cells and the like. In order to be able to provide information and parameters relating to the energy source to a user during operation and ordinary use of the backpack energy source assembly 1, it is possible that the energy source comprises an electronic circuit or a processor adapted to submit, via a data communications line or via a wireless communication, relevant data to a remote display. The remote display may for example be provided at the tool to be operated with the backpack energy source. However, it is also possible that the backpack energy source comprises a remote display adapted to be attached in positions, e.g. on the arm, in particular sleeve of the user, in any case convenient for a user to be viewed during ordinary backpack utilization of the backpack energy source assembly 1.

From the perspective and partially exploded view of FIG. 23 a further feature of the coupling interface 25, in particular carrier plate 4 can be seen. The carrier plate 4 comprises, with respect to the axial extension, approximately in a mid section lateral locking elements 42. The lateral locking elements 42 are adapted to be movable in lateral direction of the carrier plate 4. In particular, the locking elements 42 are adapted to be pushed in and pulled out of corresponding lateral locking recesses in the carrier plate 4. In the ordinary assembled state, the locking elements 42 may be secured to the carrier plate 4, in particular such that they can only be removed therefrom by overcoming a certain clamping force acting between the locking element 42 and respective locking recess.

FIG. 24 and FIG. 25 show perspective views of the carrier plate 4 of FIG. 23 with the locking elements 42 being in an unlocking position. The view of FIG. 24 is directed towards the coupling interface 25, whereas the view of FIG. 25 is directed towards the abutment face of the carrier plate 4 abutting on the back of the user in ordinary use.

FIG. 27 and FIG. 28 show perspective views of the carrier plate 4 of FIG. 23 with the locking elements 42 being in a locking position. The view of FIG. 27 is directed towards the coupling interface 25, whereas the view of FIG. 28 is directed towards the abutment face of the carrier plate 4 abutting on the back of the user in ordinary use.

FIGS. 26 and 29 respectively show an enlarged view of a locking element in FIGS. 25 and 28.

In the unlocking position, the locking elements 42 are removed from the lower positioning and guiding recesses 30 in that they are laterally pulled out, which can be seen in particular from FIG. 26. In this configuration, the lower elevations 36 can freely enter in a linear sliding motion directed top-down into the lower positioning and guiding recesses 30. This can be best seen from FIG. 24.

In order to prevent an upwards movement of the energy source 2, the locking elements 42 are provided. The locking elements 42 are adapted to lock or block the remaining motional degree of freedom in bottom-up direction once the energy source has been hooked to the carrier plate 4 and corresponding hooks 27, 28.

As can in particular be seen in connection with FIGS. 23 to 29, the, mutually identical, locking elements 42 comprise, on a platform 43, two locking ridges 48 running parallel to each other in lateral direction on the locking elements 42. The locking ridges 48 project from the locking elements 42 towards, i.e. in direction of, the coupling interface 25 and co-operate with the locking grooves 58 between the lower elevations 36A and 36B.

In the pushed-in, i.e. locked, configuration of the locking elements 42, as shown in FIGS. 27 to 29, one of the locking ridges 48 of each locking element 42 is arranged in the corresponding locking groove 58 and, thus blocked by the lower elevations 36A and 36B, such that the energy source 2 can not be moved on and in particular from the carrier plate 4 any more. and thus block linear movement of the energy source 2, in particular in a bottom-up direction.

In the pushing movement the locking elements 42 are guided with central long holes 46 on a snapping and guiding pin 52 of the coupling interface 25. In the pushed-in and pushed-out positions the locking elements 42 are fixed by a snapping mechanism wherein snapping protrusions 45 in the long hole 46 snap onto the snapping and guiding pin 5. This can be seen best inn FIGS. 26, 29 and 30. Also at the outside guiding rails 47 are provided for guiding the locking elements 42 at the carrier plate 4.

In particular with respect to the coupling and decoupling mechanism of the energy source 2 and carrier plate described further above, it can be seen, that the energy source 2 follows a combined translational and lifting movement away from the carrier plate 4 in the course of removing the energy source from the carrier plate 4. In particular the lifting movement is obtained by the wedged surfaces W.

Further it can be seen, that the latching elements 27, 28, in particular hook elements 27, 28, and/or counter latching elements, in particular counter hook elements, are adapted to latch the respective counter latching elements 32, 33 and/or latching elements of the energy source 2 for coupling the energy source 2 with the carrier plate 4 such that the latching elements interact so as to hold the energy source 2 against the gravity force as well as against the carrier plate 4, i.e. prevent it from falling down or tilting away from the carrier plate 4.

In all it becomes clear, that the backpack energy source allows comfortable and convenient use and handling.

REFERENCE SIGNS 1 backpack energy source assembly
2 energy source
3 housing
4 carrier plate
5 shoulder strap connector
6 waist strap connector
7 shoulder strap
8 waist strap
9 handle
10 energy outlet port
11 swing bearing
12 butterfly-type wing
13 limb
14 central portion
15 grommet
16 guiding hole
17 first stop element
18 second stop element
19 upper connector section
20 counterpart swing bearing section
21 cylinder type section
22 disc cap
23 strap hole
24 cutout
25 coupling interface
26 mounting section
27 central lower hook
28 lateral upper hook
29 upper positioning and guiding recess
30 lower positioning and guiding recess
31 counter coupling interface
32 central lower counter hook element
33 upper counter hook element
34 undercut
35 upper elevation
36 lower elevation
36A, 36B lower elevation
37 channel
38 upper half shell
39 lower half shell
40 ventilation opening
41 display element 42 lateral locking element
43 platform
44 cable
45 snapping protrusions
46 long hole
47 guiding rail
48 locking ridge
52 snapping and guiding pin
58 locking groove
W wedged surface

The invention claimed is:

1. A carrier system for a backpack energy source comprising a carrier plate to be carried on a back of a person, the carrier plate comprising a coupling interface implemented or designed to be exchangeably or removably coupled to a counter coupling interface of the energy source,
wherein the coupling interface of the carrier plate and the counter coupling interface of the energy source comprise at least three pairs of latching elements or counter latching elements and at least one positioning and guiding element,
wherein the at least three pairs of latching elements or counter latching elements comprise at least three latching elements or counter latching elements of the carrier plate that are configured to latch at least three respective counter latching elements or latching elements of the energy source for coupling the energy source with the carrier plate, wherein the at least three pairs of latching elements or counter latching elements interact so as to hold the energy source against a gravity force as well as against the carrier plate,
wherein the at least one positioning and guiding element is configured to position or align and guide the energy source during a coupling movement,
wherein the at least one positioning and guiding element comprises at least one positioning and guiding recess and at least one positioning and guiding projection, the at least one positioning and guiding recess and the at least one positioning and guiding projection having one or more wedged surfaces, and
wherein the carrier system further comprises a cooperating pair of lifting elements at the coupling and counter coupling interface, the cooperating pair of lifting elements comprising an inclined or wedged surface upon which at least one of the lifting elements glides in a decoupling direction away from the carrier plate during decoupling.

2. The carrier system according to claim 1, wherein the coupling interface and the counter coupling interface are adapted to couple or decouple the energy source to or from the carrier plate, respectively, in an at least partially translational or linear movement which is parallel to the carrier plate or the coupling interface.

3. A carrier system according to claim 2, wherein the translational or linear movement, during decoupling of the energy source from the carrier plate, is followed by or combined with a lifting movement of the energy source away from the carrier plate which is supported or effected by the pair of cooperating lifting elements,
wherein the inclined or wedged surface of one of the pair of cooperating lifting elements is inclined towards the decoupling direction such that in addition to the translational or linear movement during the decoupling away from the carrier plate, the energy source moves in a direction orthogonal to the carrier plate during the decoupling.

4. The carrier system according to claim 1, wherein the carrier plate comprises a center platform or base plate corresponding in its dimensions to dimensions of the coupling interface, wherein the center platform or base plate has fastening elements in the form of elevations or depressions, adapted to removably fasten the energy source to the carrier plate.

5. The carrier system according to claim 1, wherein the carrier plate comprises at least one extension, extending in an axial direction of the carrier plate and adapted to attach strap connectors to the carrier plate.

6. The carrier system according to claim 1, wherein the at least one positioning and guiding element is of elongated shape having a main axial extension in parallel to an axial direction of the carrier plate.

7. The carrier system according to claim 1, comprising at least one push-locking element adapted to mutually lock the carrier plate and energy source in a coupled state and to intersect or block a decoupling relative movement of the carrier plate and energy source, wherein the at least one push-locking element is movable in a direction transversal to the coupling or decoupling movement or parallel to the carrier plate.

8. The carrier system according to claim 7, wherein the at least one push-locking element comprises lateral locking bars accessible from lateral sides of the carrier plate, wherein the lateral locking bars are movably attached to the carrier plate and are adapted to lock the energy source and carrier plate in a laterally pushed-in position, and to release the energy source and carrier plate in a laterally pushed-out position.

9. The carrier system according to claim 1, comprising a strap connector unit adapted to be fitted with straps for strapping the carrier system to the back of the person, wherein the strap connector unit comprises at least one rest element adapted to rest against the back of the person, wherein the rest element is attached to the carrier plate such that the rest element is moveable in parallel to the carrier plate and pivotable about an axis running essentially parallel to a carrier plate transversal axis, and wherein the at least one rest element is movable between at least two different axial positions of the carrier plate,
wherein the at least one rest element is one of a shoulder rest element and a waist rest element, adapted for resting against a shoulder area and a waist area of the person, respectively, attached to a side of the carrier plate averted from the coupling interface.

10. The carrier system according to claim 9, wherein the shoulder rest element is in the form of a plate having two butterfly-like wings, wherein the wings respectively comprise strap holes adapted to thread through a shoulder strap,
or wherein the waist rest element is in the form of a belt having two laterally extending limbs adapted for resting against the waist area of the person, wherein the limbs respectively comprise strap loops adapted to thread through a waist strap,
or wherein the carrier plate comprises at least one rotation limiter adapted to limit a freedom of rotation of the at least one rest element, wherein the at least one rotation limiter comprises stop elements with stop faces implemented at counterpart bearing elements or comprises a pin and guide-hole type swing lock.

11. The carrier system according to claim 1, wherein the carrier plate comprises an open-celled structure comprising stiffening bars, stringers, fins, or ribs, wherein the open-celled structure is of linear, curved, mutually crossing, or honeycomb arrangement, and wherein the open-celled structure is provided at least on a side averted from the coupling interface.

12. The carrier system according to claim 1, wherein the at least three pairs of latching elements or counter latching elements are provided at the coupling and counter coupling interfaces, the at least three pairs of latching elements or counter latching elements comprising one central latching element in a lower region and two lateral latching elements in an upper region of the carrier plate when the carrier plate is carried in an upright position at the back.

13. A carrier system for a backpack energy source comprising a carrier plate to be carried on a back of a person, the carrier plate comprising a coupling interface implemented or designed to be exchangeably or removably coupled to a counter coupling interface of the energy source,
   wherein the coupling interface of the carrier plate and the counter coupling interface of the energy source comprise at least three pairs of latching elements or counter latching elements and at least one positioning and guiding element,
   wherein the at least three pairs of latching elements or counter latching elements comprise at least three latching elements or counter latching elements of the carrier plate that are configured to latch at least three respective counter latching elements or latching elements of the energy source for coupling the energy source with the carrier plate, wherein the at least three pairs of latching elements or counter latching elements interact so as to hold the energy source against a gravity force as well as against the carrier plate,
   wherein the at least one positioning and guiding element is configured to position or align and guide the energy source during a coupling movement,
   wherein the at least one positioning and guiding element comprises at least one positioning and guiding recess and at least one positioning and guiding projection, the at least one positioning and guiding recess and the at least one positioning and guiding projection having one or more wedged surfaces,
   wherein the coupling interface and the counter coupling interface are adapted to couple or decouple the energy source to or from the carrier plate, respectively, in an at least partially translational or linear movement which is parallel to the carrier plate or the coupling interface,
   wherein the translational or linear movement, during decoupling of the energy source from the carrier plate, is followed by or combined with a lifting movement of the energy source away from the carrier plate which is supported or effected by at least one pair of cooperating lifting elements at the coupling interface and the counter coupling interface, and
   wherein at least one of a pair of cooperating lifting elements has an inclined or wedged surface inclined towards a decoupling direction on which the other lifting element glides thereby lifting the energy source in the lifting movement in addition to the translational or linear movement during the decoupling away from the carrier plate in a direction orthogonal to the carrier plate.

14. A carrier system for a backpack energy source comprising a carrier plate to be carried on a back of a person, the carrier plate comprising a coupling interface implemented or designed to be exchangeably or removably coupled to a counter coupling interface of the energy source,
   wherein the coupling interface of the carrier plate and the counter coupling interface of the energy source comprise at least three pairs of latching elements or counter latching elements and at least one positioning and guiding element,
   wherein the at least three pairs of latching elements or counter latching elements comprise at least three latching elements or counter latching elements of the carrier plate that are configured to latch at least three respective counter latching elements or latching elements of the energy source for coupling the energy source with the carrier plate, wherein the at least three pairs of latching elements or counter latching elements interact so as to hold the energy source against a gravity force as well as against the carrier plate,
   wherein the at least one positioning and guiding element is configured to position or align and guide the energy source during a coupling movement,
   wherein the at least one positioning and guiding element comprises at least one positioning and guiding recess and at least one positioning and guiding projection, the at least one positioning and guiding recess and the at least one positioning and guiding projection having one or more wedged surfaces,
   wherein the at least three pairs of latching elements or counter latching elements are provided at the coupling and counter coupling interfaces, the at least three pairs of latching elements or counter latching elements comprising one central latching element and two lateral latching elements; and
   wherein the carrier system further comprises a cooperating pair of lifting elements at the coupling and counter coupling interface, the cooperating pair of lifting elements comprising an inclined or wedged surface upon which at least one of the lifting elements glides in a decoupling direction away from the carrier plate during decoupling.

* * * * *